(12) United States Patent
Carless

(10) Patent No.: US 10,036,155 B2
(45) Date of Patent: Jul. 31, 2018

(54) BUILDING SYSTEM AND PANEL FOR A BUILDING SYSTEM

(71) Applicant: New Building Systems Pty Ltd, Newport, NWS OT (AU)

(72) Inventor: Glenn Carless, Avalon (AU)

(73) Assignee: NEW BUILDING SYSTEMS PTY LTD, Newport, NSW (AU)

( * ) Notice: Subject to any disclaimer, the term of this patent is extended or adjusted under 35 U.S.C. 154(b) by 0 days.

(21) Appl. No.: 15/440,142

(22) Filed: Feb. 23, 2017

(65) Prior Publication Data

US 2017/0218615 A1     Aug. 3, 2017

Related U.S. Application Data

(63) Continuation-in-part of application No. 14/408,978, filed as application No. PCT/AU2013/000723 on Jul. 3, 2013, now Pat. No. 9,617,725.

(30) Foreign Application Priority Data

Jul. 4, 2012 (AU) ................................ 2012902851
Oct. 22, 2012 (AU) ................................ 2012244116

(51) Int. Cl.
    *E04B 1/19*         (2006.01)
    *E04C 2/52*         (2006.01)
    *E04C 2/284*       (2006.01)

(52) U.S. Cl.
CPC ............ *E04B 1/1909* (2013.01); *E04C 2/284* (2013.01); *E04C 2/52* (2013.01); *E04B 2001/199* (2013.01); *E04B 2001/1921* (2013.01); *E04B 2001/1996* (2013.01)

(58) Field of Classification Search
CPC .. E04B 1/19; E04B 1/1909; E04B 2001/1993; E04C 2/292; E04C 2/521
USPC .... 52/650.3, 653.2, 656.1, 761, 781, 309.14
See application file for complete search history.

(56) References Cited

U.S. PATENT DOCUMENTS

| 3,882,650 | A | * | 5/1975 | Gugliotta | E04B 1/1906 403/176 |
| 4,129,975 | A | | 12/1978 | Gabriel | |
| 4,628,650 | A | * | 12/1986 | Parker | E04B 1/14 52/265 |
| 5,136,822 | A | * | 8/1992 | Blum | E04B 1/0007 52/241 |
| 5,265,395 | A | | 11/1993 | Lalvani | |

(Continued)

FOREIGN PATENT DOCUMENTS

| CA | 1259467 A | 9/1989 |
| DE | 1928840 A1 | 12/1970 |

(Continued)

*Primary Examiner* — Patrick J Maestri
(74) *Attorney, Agent, or Firm* — Melvin Li; Heslin Rothenberg Farley & Mesiti PC

(57) ABSTRACT

A building system comprising a plurality of tubes, a plurality of connection nodes comprising tubular sections for connection to the tubes, wherein the tubes are arranged to connect between the connection nodes to form a frame for a building, wherein at least one continuous cavity is formed through at least a portion of the nodes and tubes when the nodes and tubes are connected, the building system further comprising fluid tight seals between the tubes and connection nodes to enable fluid to flow through the at least one continuous cavity.

11 Claims, 45 Drawing Sheets

(56) References Cited

U.S. PATENT DOCUMENTS

| | | | |
|---|---|---|---|
| 6,418,686 B1 | 7/2002 | Record | |
| 7,316,598 B1 * | 1/2008 | Lock | A63H 33/102 |
| | | | 446/126 |
| 7,823,347 B1 | 11/2010 | Blinn | |
| 9,617,725 B2 | 4/2017 | Carless | |
| 2010/0192491 A1 | 8/2010 | Van Randen | |

FOREIGN PATENT DOCUMENTS

| | | |
|---|---|---|
| DE | 3710230 A1 | 10/1988 |
| GB | 1497576 A | 1/1978 |
| GB | 1515014 A | 6/1978 |
| JP | 2000220208 A | 8/2000 |
| WO | 2001051741 A1 | 7/2001 |

* cited by examiner

BUILDING SYSTEM AND PANEL FOR A BUILDING SYSTEM

CROSS REFERENCE TO RELATED APPLICATIONS

The present application is a continuation-in-part application claiming benefits from U.S. patent application Ser. No. 14/408,978 filed Dec. 18, 2014, International Patent Application No. PCT/AU2013/000723 filed Jul. 3, 2013, Australian Patent Application No. 2012244116 filed Oct. 22, 2012 and Australian Patent Application No. 2012902851 filed Jul. 4, 2012, contents of all of which are incorporated herein in their entirety.

TECHNICAL FIELD

The present invention relates to building system and panel for a building system. In particular, the present invention relates to a building system with a frame that enables fluid to flow there through, a building system with a tensile element, a composite panel for a building system, a building system with a platform structure, and a building system that defines at least one human useable zone.

BACKGROUND

Known building systems revolve around the assembling of various materials in a particular manner on a chosen site to form the building, which is then used as a human useable zone. For example, the human useable zone may be a home, house, apartment, collection of homes and/or apartments, one or more office buildings, shelter(s), office block(s), temporary building structure(s), hangar(s), storage area(s), stadiums, grandstands or other defined space in which people may utilise the space internal or external to the frame of the building for their desired needs.

For example, the basic bricks and mortar system requires the bricks to be delivered and laid using cement in a specified manner to create the basic outline of the building, additional items and processes are then applied to gradually build the premises at the site. This requires all the materials to be delivered separately to the site and for a large amount of man power to be used for the separate processes in order to produce the desired structure.

Modular systems have been developed, which utilise multiple components that fit together to form a shell. However, these systems generally are not easily adaptable and therefore generally provide a fixed solution. Further, these types of systems may only be structurally sound when the structure is formed as a single level resulting in structural and design limitations.

An object of the present invention is to provide an improved building system that provides flexibility in configurations. A further object of the present invention is to provide improved structural stability for building systems. Each object is to be read distinctively with the object of at least providing the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge in the art in any country. Any references discussed state the assertions of the author of those references and not the assertions of the applicant of this application. As such, the applicant reserves the right to challenge the accuracy and relevance of the references discussed.

SUMMARY

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements. It will be understood that this intended meaning also similarly applies to the terms mentioned when used to define steps in a method or process.

It will be understood that, when describing various integers, such as modules, components, elements etc., any integer may be constituted by a single integer or multiple integers.

According to one aspect, the present invention provides a building system comprising a plurality of tubes, a plurality of connection nodes comprising tubular sections for connection to the tubes, wherein the tubes are arranged to connect between the connection nodes to form a frame for a building, wherein at least one continuous cavity is formed through at least a portion of the nodes and tubes when the nodes and tubes are connected, the building system further comprising fluid tight seals between the tubes and connection nodes to enable fluid to flow through the at least one continuous cavity.

According to a further aspect, the present invention provides a building system comprising a plurality of tubes, a plurality of connection nodes comprising tubular sections for connection to the tubes, and at least one tensile element, wherein the tubes are arranged to connect between the connection nodes to form a frame, and the frame forms at least part of a human useable zone of predetermined size, shape and geometry, wherein a continuous cavity is formed through at least a portion of the tubular sections and tubes when the tubular sections and tubes are connected, the cavity arranged to receive the at least one tensile element, wherein the tensile element is attached between at least two points on the frame for countering tension in the frame.

According to yet a further aspect, the present invention provides a building system comprising a plurality of connection nodes, a plurality of tubes, and a platform structure, wherein the tubes are arranged to connect between the connection nodes to form a frame, the tubes comprise at least one planar portion extending from an outer circumference of the tubes in a direction that is substantially perpendicular to the tangent of the outer circumference, and the platform structure is attached to the at least one planar portion of at least two tubes, wherein at least a portion of the connection nodes comprise at least three extending portions that are arranged to connect with at least three tubes to form the frame.

According to yet a further aspect, the present invention provides a composite panel for a building system, the panel comprising at least two panel portions, wherein each of the at least two panel portions comprises a first metal outer layer, a second metal outer layer, and a foam core positioned in between the first and second metal outer layers, wherein first and a second panel portions are bonded together to form the composite panel having an inner surface and an outer surface, and the panel is adapted for use as a flooring component of a building structure.

According to yet a further aspect, the present invention provides a building system comprising a plurality of connection nodes, a plurality of tubes, and a plurality of panels, wherein the tubes are arranged to connect between the connection nodes to form a frame, and the panels are attachable to the frame to define at least one human useable zone of predetermined size, shape and geometry, wherein at least a portion of the connection nodes comprise at least two extending portions that are arranged to connect with at least two tubes, and the at least two extending portions are positioned at an angle of 135 degrees relative to each other to form the frame having an octagonal plan cross-section, wherein the tubes comprise a planar portion extending from an outer circumference of the tubes in a direction that is substantially perpendicular to the tangent of the outer circumference, and the planar portion forms a panel attachment surface for attachment to the panels.

BRIEF DESCRIPTION OF THE DRAWINGS

Embodiments of the present invention will now be described, by way of example only, with reference to the accompanying drawings, in which.

DESCRIPTION OF EMBODIMENTS

First Embodiment

The following description describes various components and elements that are used to form one or more building structures according various embodiments.

Figure 1A:
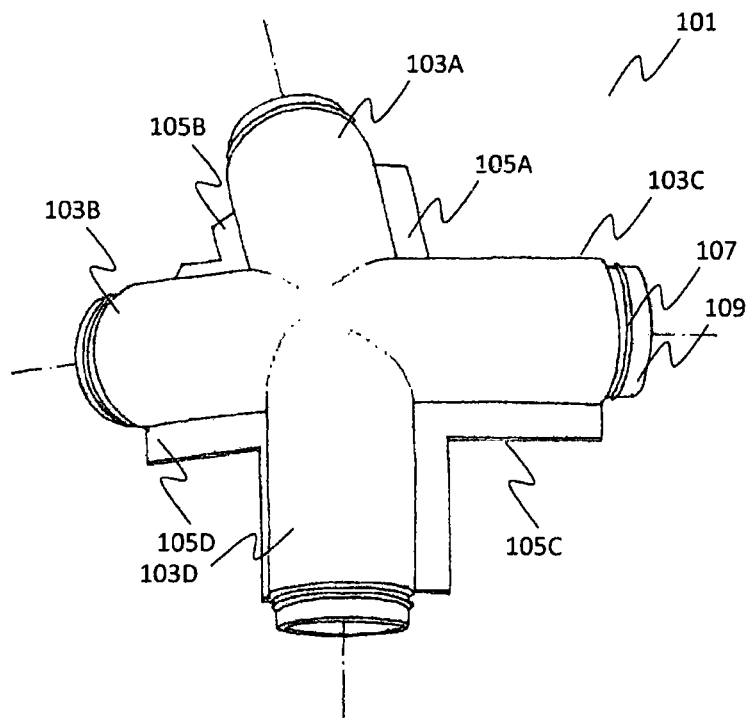
FIGS. 1A to 1C show a connection node according to an embodiment of the present invention.
Figure 1B:
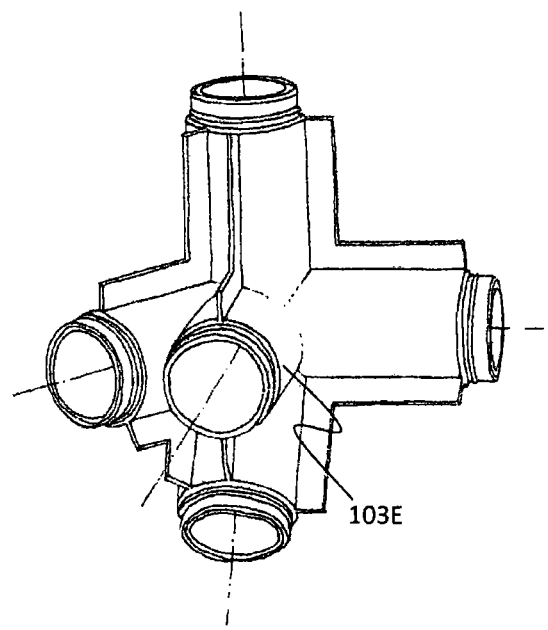

FIGS. 1A and 1B show an example of a connection node 101 from opposing sides. According to this embodiment, the connection node is a casting made from aluminium. It will be understood that the connection node may be made from other suitable materials and using other suitable manufacturing methods, such as metal extrusions for example.

The connection node 101 shown in FIG. 1A and FIG. 1B is one example of several different forms that the connection node may have. This particular example has five extending portions 103A to 103E that extend from a common point on the connection node.

Figure 1C:
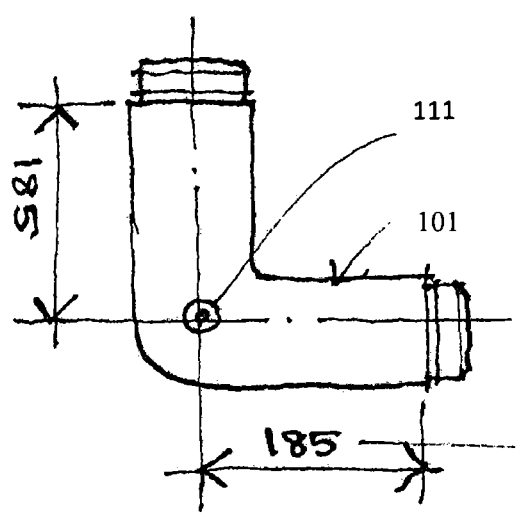

It will be understood that the connection nodes may have at least two extending portions, for example two, three, four, five or six extending portions, that extend from a common point on the connection node. However, the distance between the common central connection point and the end of each extending portion is a fixed distance regardless of the number of extending portions. As shown in FIG. 1C, according to this embodiment, the distance between the point of central connection (common point) 111 and the end of each extending portion (i.e. the point on the extending portion that comes into contact with a further connection) is 185 mm. It will be understood that this length may be varied to form different sized structures, but that the chosen length must be the same for all extending portions in any one structure. It will also be understood that, in an embodiment, the common central point may advantageously, be a non-spherical common central point.

The angles between the extending portions will vary depending on the configuration of the connection node. However, it is important to note that in order to define the shape of the final construction of certain embodiments and enable all parts of the system to fit together, various extending portions within some of the connector nodes are positioned at defined angles. For example, as can be seen in FIGS. 1A and 1B, various extending portions (e.g. 103A and 103D) are positioned at an angle of 135° from each other (using the point of central connection as a reference point). It will become apparent that the angle 135° is important as it relates to an octagon shape, which is the cross sectional shape of the formed frames according to this embodiment and so forms a frame having an octagonal plan cross-section.

It can also be seen that other extending portions (e.g. 103A and 103C) are positioned at right angles to each other.

Each of the extending portions has a hollow interior and a circular cross-section having an outer diameter of approximately 101.6 mm and an inner diameter of approximately 93.6 mm. Thus the walls of the extending portions have a thickness of approximately 4 mm. It will be understood that these dimensions are approximate and that, as an alternative, the inner and outer diameters may be varied.

Planar portions 105A to 105D (fins) are formed on the connection node such that they extend substantially perpendicular to the tangent of the outer circumference of the extending portions 103. The fins provide a panel attachment surface for attaching panels as described in more detail below.

The distal end of each extending portion has an outer diameter that is smaller than the outer diameter of the remaining part of the extending portion. This end of the extending portion forms a male interface 109 that corresponds with a female interface on a connector element (interconnecting tube) as described below. A groove is provided around the circumference of the male interface 109 to receive an O-ring 107. The O-ring seal provides a waterproof seal at the point where the extending portion connects to the connector element.

The orientation of each of the extending portions (103A to 103E) relative to the common point on the connection node is chosen to define the overall geometry of the building structure, as will become apparent below.

As explained above, further configurations of connector nodes are also provided having fewer or more extending portions extending from the common point on the connection node.

It can be seen from FIGS. 1A, 1B and 1C that the portion of the connection node 101 around the common point 111 is integrally formed with the extending portions 103A to 103E that extend from the common point on the connection node 101.

Figure 2:
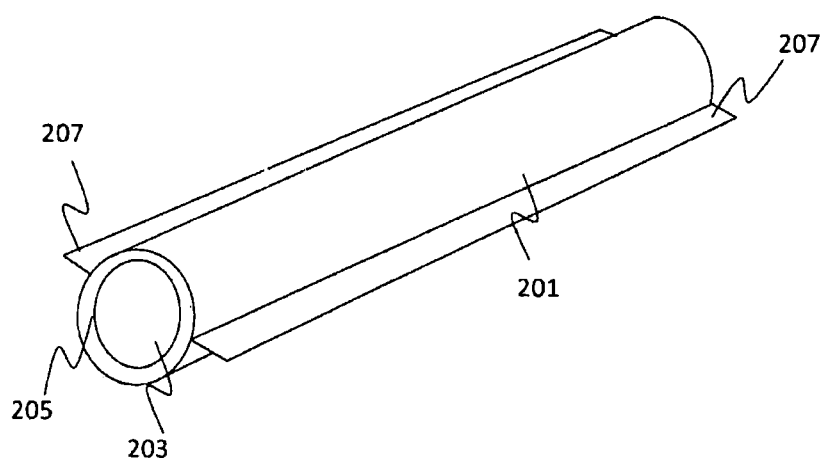
FIG. 2 shows a connector element according to an embodiment of the present invention.

FIG. 2 shows a connector element 201 according to this embodiment. The connector element is a tube with a hollow interior. Each connector element has a circular cross-section having an outer diameter of approximately 101.6 mm and an inner diameter of approximately 93.6 mm. Thus, the walls of the connector elements have a thickness of approximately 4 mm. It will be understood that these dimensions are approximate and that, as an alternative, the inner and outer diameters may be varied.

The lengths of the connector elements may vary depending upon their position within the building structure. For example, the connector elements may be anywhere between 0.5 meters and 2 meters long. Preferably, according to this embodiment, the connector elements are formed having four different lengths. The connecting elements may be 730 mm, 1185 mm, 1535 mm or 1830 mm depending upon the position within the structure that the connector elements are being placed.

A female interface 203 that corresponds with the male interface 109 on the connector nodes is formed on each end of the tube. An internal surface 205 of the female interface provides a sealing surface that cooperates with the O-ring seal 107.

The male interface 109 corresponds with the female interface 203 on the connector element 201 (interconnecting tube). The male interface 109 enters into the female interface enabling the O-ring seal 107 to engage with the internal surface 205 of the female interface to provide a sealing surface around the circumference of the male interface 109.

Further, each connector element 201 has two planar portions 207 (fins) that extend substantially perpendicular to the tangent of the outer circumference of the connector element in the same manner as the fins described above in relation to the connection nodes.

Figure 3A:
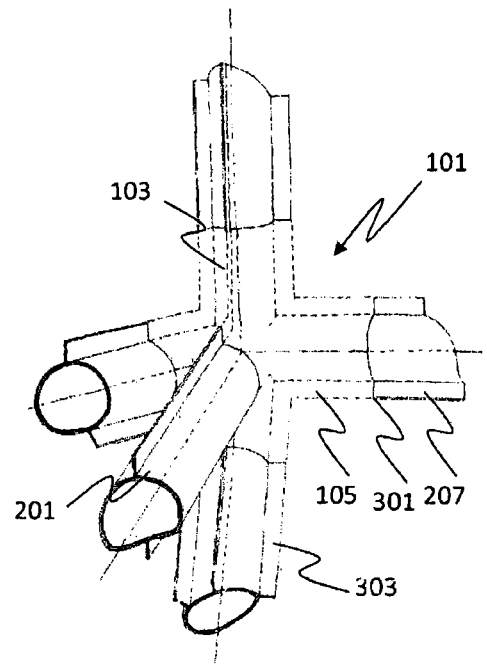
FIGS. 3A and 3B show a connection node with connector elements according to an embodiment of the present invention.
Figure 3B:
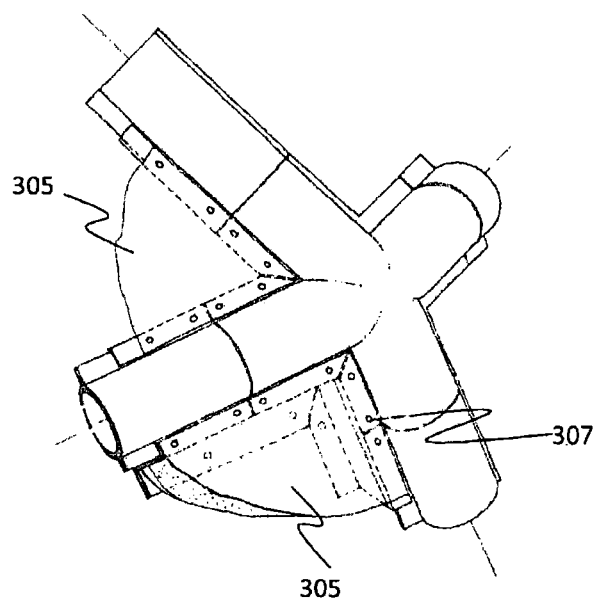

FIGS. 3A and 3B show a connection node 101 with a number of connector elements (tubes) 201 attached to the connection node. That is, the female interfaces of the tubes are engaged with the male interfaces of the extending portions on the connection nodes.

According to FIG. 3A, it can be seen that the orientation of the tubes with respect to the connection nodes is such that the fins 105 on the connection nodes and the fins 207 on the tubes are joined together and aligned (301) to provide a substantially continuous panel attachment surface 303 for attaching panels as described below.

Referring to FIG. 3B, a portion of a panel 305 is shown connected to a portion of the panel attachment surface 303. The panel 305 is attached to the fins (105 and 301) on the connection node and tubes respectively using connectors 307, such as rivets. Further details of how the panels are connected are provided below.

FIGS. 4A to 4L show cross sectional views of various configurations of connector elements (tubes) that may be used to form the building structure. Each connector element has an outer diameter of approximately 101.6 mm and an inner diameter of 93.6 mm, in the same manner as the connection nodes. Each tube has an internal channel 401.

Further, each of the fins extends approximately 25 mm from the outer surface of the tube and has a width of approximately 4 mm. It will be understood that these dimensions are approximate and that, as an alternative, the inner and outer diameters may be varied.

The various configurations shown in FIGS. 4A to 4L vary by way of the number of fins and the relative positioning of the fins around the outer circumference of the tube.

Figure 4A:
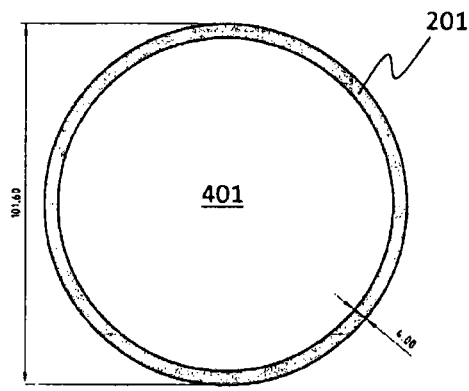
FIGS. 4A to 4L show cross sectional views of various connector element configurations according to various embodiments of the present invention.
Figure 4B:
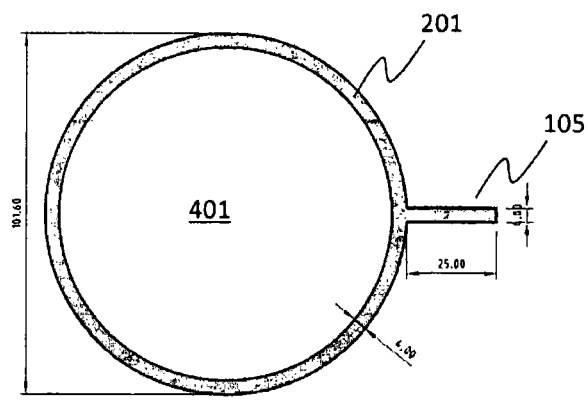
Figure 4C:
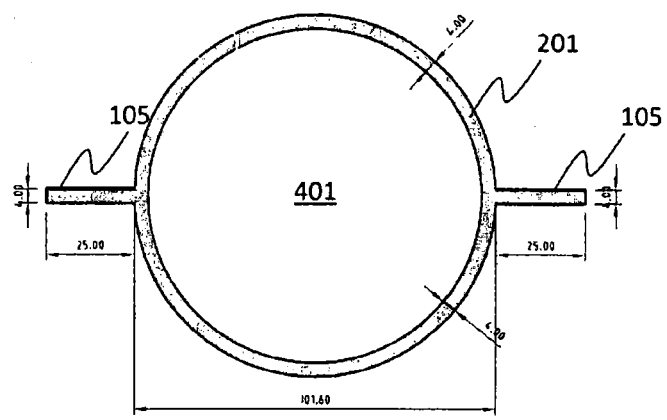
Figure 4D:
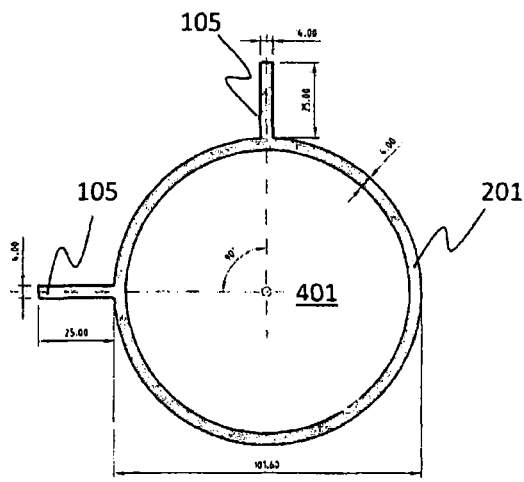

FIG. 4A shows a basic tube with no fins. FIG. 4B shows a tube with a single fin 105. FIG. 4C shows a tube with two fins 105, where the fins are diametrically opposed to each other. FIG. 4D shows a tube with two fins 105 where the fins are separated around the outer circumference of the tube by 90°.

Figure 4E:
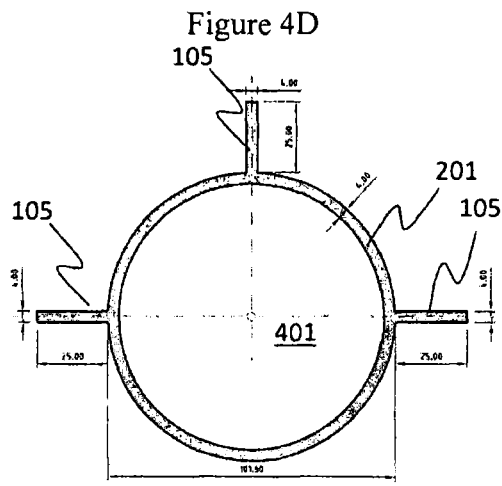

FIG. 4E shows a tube with three fins 105 where a first and second fin is separated by 90°, a third fin is separated from the second fin by 90° and the first fin by 180° around the circumference of the tube.

Figure 4F:
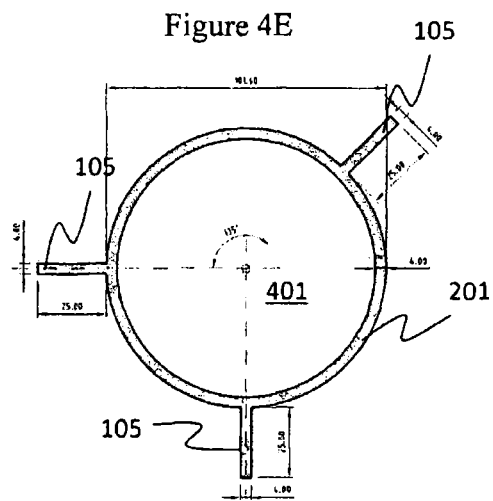

FIG. 4F shows a tube with three fins 105 where a first and second fin are separated by 90°, and a third fin is separated from the first and second fins by 135°.

Figure 4G:
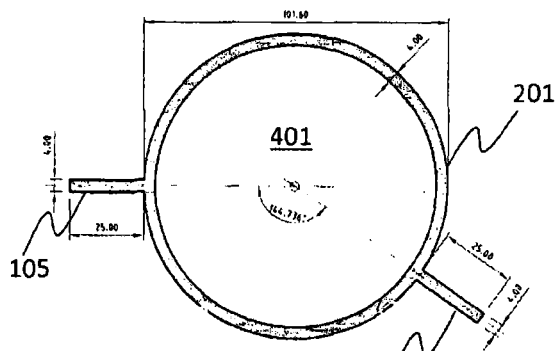

FIG. 4G shows a tube with two fins 105, where the fins are separated by 144.74°.

Figure 4H:
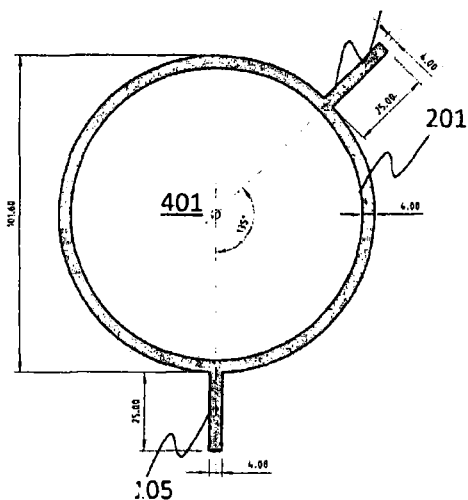

FIG. 4H shows a tube with two fins 105, where the fins are separated by 135°.

Figure 4I:
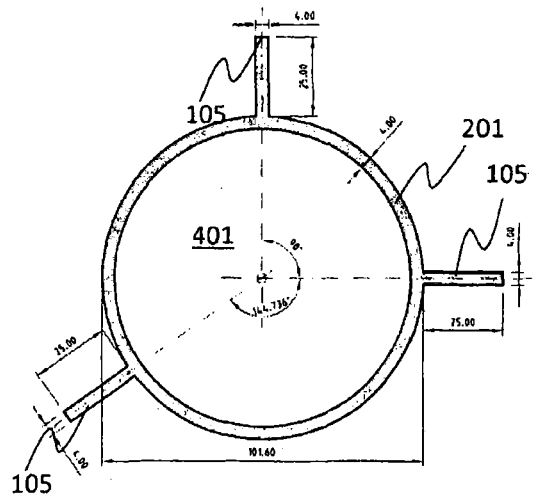

FIG. 4I shows a tube with three fins 105 where a first and second fin are separated by 90°, and a third fin is separated from the second fin by 144.74° and separated from the first fin by 125.26°.

Figure 4J:
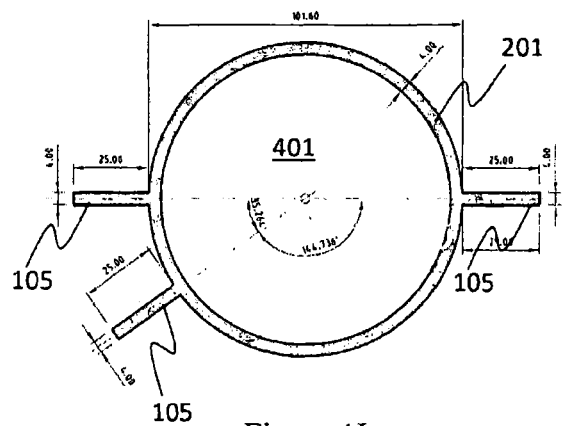

FIG. 4J shows a tube with three fins 105, where a first and second fin are diametrically opposed to each other, and a third fin is separated from the first fin by 35.26° and separated from the second fin by 144.74°.

Figure 4K:
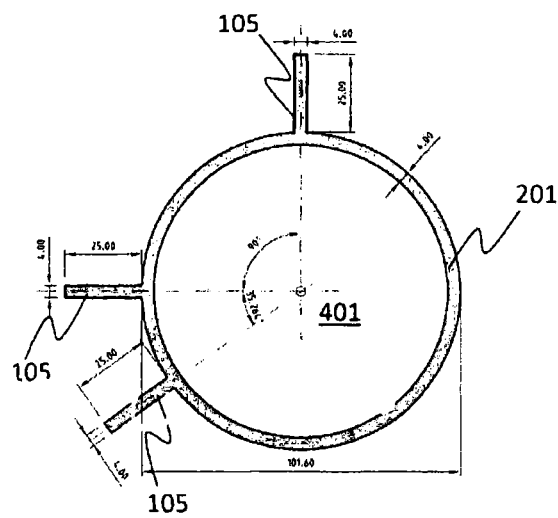

FIG. 4K shows a tube with three fins 105, where a first and second fin are separated by 90°, and a third fin is separated from the first fin by 35.26° and the second fin by 125.26°.

Figure 4L:
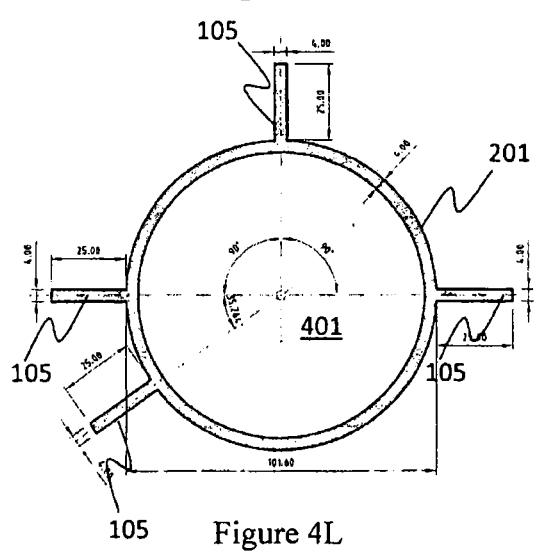

FIG. 4L shows a tube with four fins 105, where a first and second fin is separated by 90°, a second and third fin is separated by 90° where the first and third fin are separated by 180°. Further, the fourth fin is separated from the first fin by 35.26° and the second fin by 125.26°, Although the above defined angular specifications are required for the specific geometric structure as described herein for this embodiment, it will be understood that, as an alternative, the angular measurements may be adjusted for different geometric configurations. Further, it will be understood that the measurements provided are approximate based upon standard tolerances.

Figure 5A:
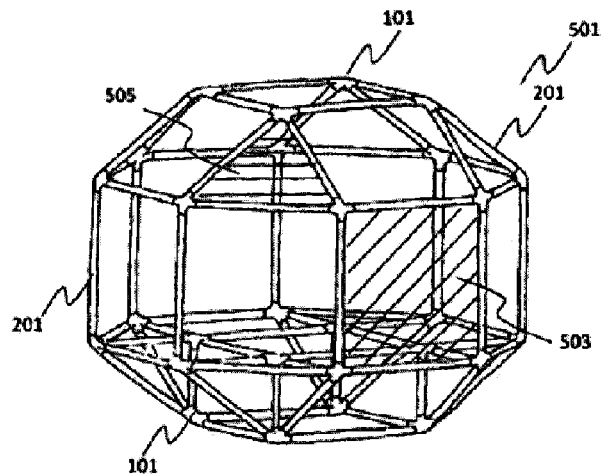
FIGS. 5A and 5B show examples of a frame structure according to an embodiment of the present invention.
Figure 5B:
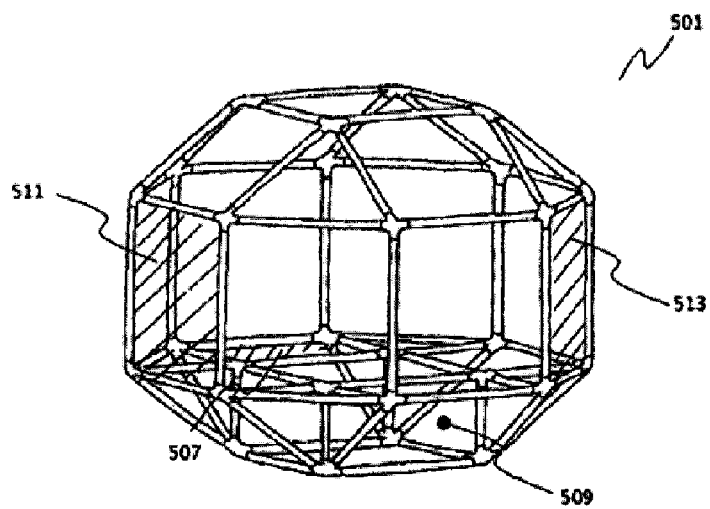

FIGS. 5A and 5B show examples of a basic frame structure 501 according to this embodiment. The frame is made up of 28 connector nodes 101. Each connector node is connected to at least one other connector node via a tube 201. A total of 64 tubes are provided according to this configuration. Although not clearly shown in FIGS. 5A and 5B, it will be understood that the tubes shown in FIGS. 5A and 5B include fins that extend from the outer circumference of the tubes to provide panel attachment surfaces as shown in FIGS. 3A and 3B.

The basic frame structure forms a shape, which, if in solid form, is known as an Elongated Square Gyrobicupola, or the 37$^{th}$ Johnson Solid. By connecting the connection nodes, tubes and panels together a human useable zone of predetermined size, shape and geometry is created within the boundary of the frame. This zone is predetermined based on the chosen geometry and size of the connection nodes, tubes and panels.

It can be seen that the areas bounded by the outer tubes provide panel attachment areas at various positions around the outer perimeter of the frame 501. That is, panels that are substantially rectangular or triangular in shape (i.e. plan view) may be attached to these panel attachment areas. For example, a first panel attachment area 503 is suitable for a wall panel. A second panel attachment area 505 is suitable for a ceiling panel. A third panel attachment area 507 is suitable for a floor panel.

Referring to FIG. 5B, a space 509 is provided underneath the panel attachment areas being used for attaching the floor panels. The space 509 may be used, for example, as a utility space for placing electrical and communication cabling, gas and water pipes and other utility works throughout the building structure.

It can be seen, that the frame has eight outer panel attachment surfaces around the central portion of the frame, which is effectively shaped like an octagon when viewed from above. Four of those surfaces are side surfaces 511, and the other four are corner surfaces 513.

Figure 6A:
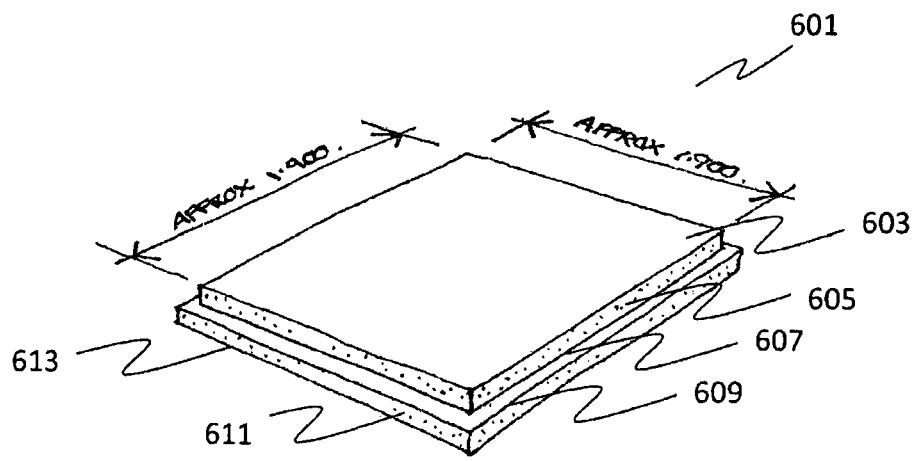
FIGS. 6A to 6F show various composite panel arrangements according to an embodiment of the present invention.

FIG. 6A shows a profile view of a composite panel 601 according to this embodiment. The composite panel includes two separate panels that are joined together.

A first panel is formed from an outer metal layer 603, a foam layer 605 and a second metal layer 607. The first metal layer 603 and foam layer have substantially the same x, y dimensions. The second metal layer 607 is slightly larger than the first layer (and the foam) to provide an overlapping metal area.

A second panel is formed from an outer metal layer 609, a foam layer 611 and a second metal layer 613. The second metal layer of the first panel is attached or bonded to the first metal layer of the second panel to form the composite panel.

It will be understood that the metal layers may be formed from any suitable metal, such as aluminium or steel for example. Further, it will be understood that the foam layers are formed from any suitable foam material, such as polyurethane foam. Further, the foam material may have fire retardant properties.

Figure 6B:
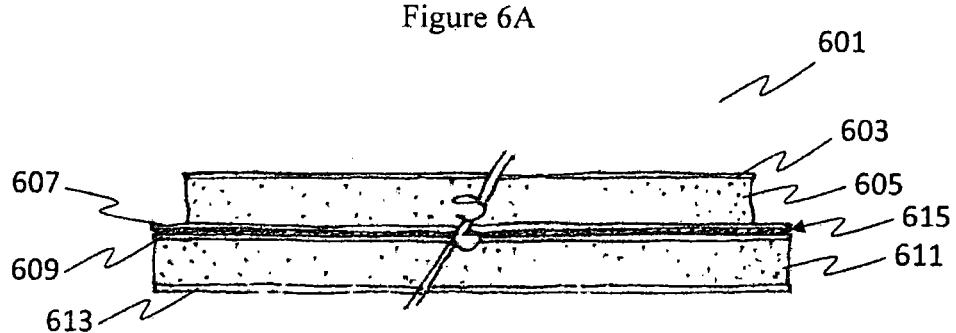

FIG. 6B shows a cross sectional view of the composite panel. The same reference numerals as in FIG. 6A are used to show the same components. Further, according to this embodiment, the first and second panels are bonded together using any suitable metal adhesive 615. However, it will be understood that the first and second panels may be bonded together using any other suitable attachment means.

Figure 6C:
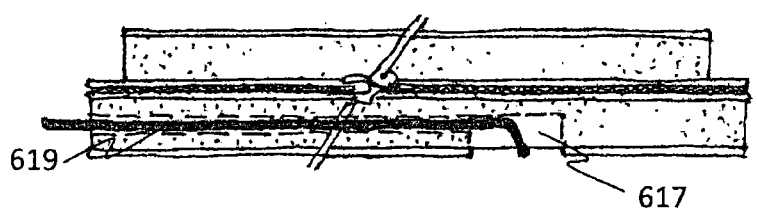
Figure 6D:
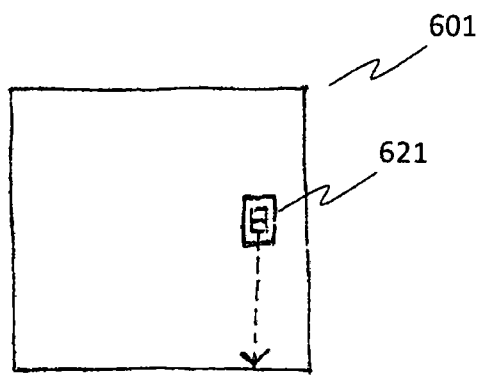
Figure 6E:
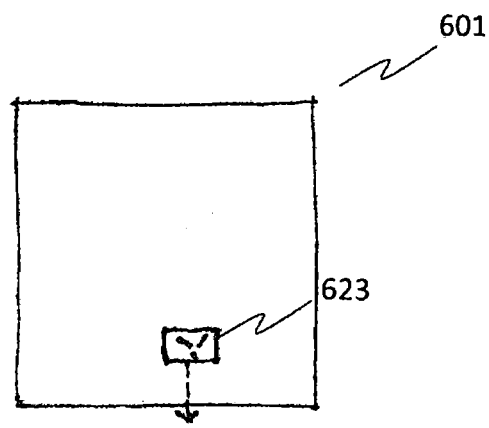
Figure 6F:
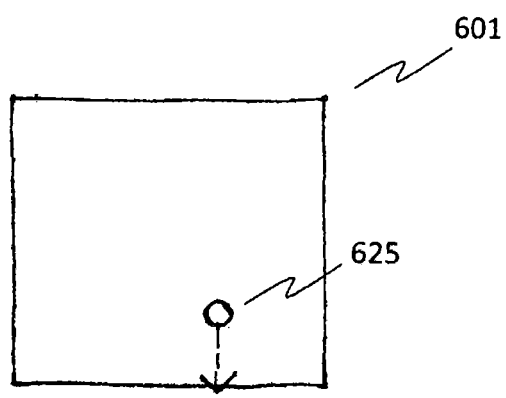

FIG. 6C shows a composite panel that has been specifically adapted for the provision of services within the structure being formed. A service furrow or channel 617 is formed within the composite panel to enable services pipes, plumbing, cabling, wiring or conduits 619 to be provided within the channel. As shown in FIGS. 6D to 6F various different connection elements or outlets may be specifically attached to a front or rear surface of a composite panel, such as an electrical switch outlet 621, electrical power outlet 623 and a utility outlet 625, such as a water, gas or any other suitable utility outlet. For example, the outlet may be used to connect one or more of a light element, media communications socket, internal or external water pipe, utility meter, air conditioning unit, alarm system, intelligent home control system etc.

The composite panel may be used to form a part of the inner or external walls, floor or sealing of the structure being built.

FIGS. 7A to 7D show attachment elements (clips) for attaching the panels to the fins on the connection nodes and tubes. Four different types of attachment elements are provided according to this embodiment.

Figure 7A:
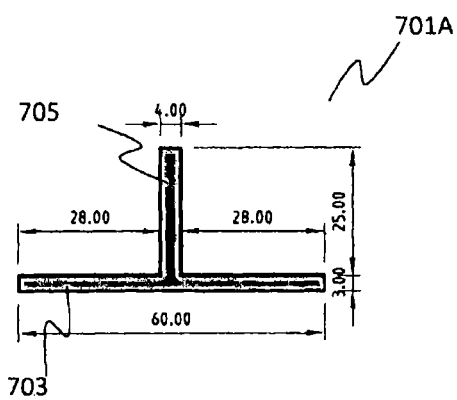
FIGS. 7A to 7D show attachment elements according to an embodiment of the present invention.

FIG. 7A shows a cross section of a first clip 701A. The clip includes a planar member 703, with an extending member 705 extending from the planar member at an angle that is substantially perpendicular to the longitudinal surface of the planar member. The extending member 705 is located approximately halfway across the width (as viewed in FIG. 7A) of the planar member 703. The width of the planar member is substantially 60 mm and the thickness is substantially 3 mm. The height of the extending member (i.e. the distance it extends from the planar member) is substantially 25 mm and the thickness is substantially 4 mm.

Figure 7B:
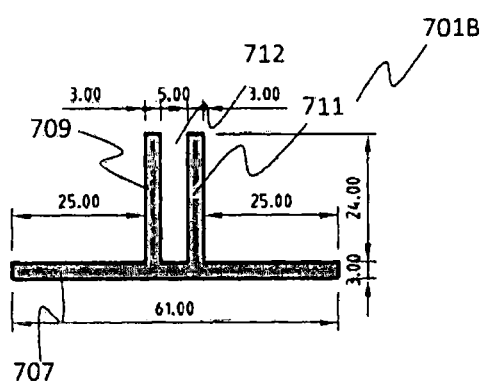

FIG. 7B shows a cross section of a second clip 701B. The clip includes a planar member 707, with a first extending member 709 extending from the planar member at an angle that is substantially perpendicular to the longitudinal surface of the planar member. A second extending member 711 also extends from the planar member at an angle that is substantially perpendicular to the longitudinal surface of the planar member. The first and second extending members are substantially parallel to each other and separated by approximately 5 mm to form a channel 712 that is arranged to receive a corresponding fin. The width of the planar member is substantially 61 mm and the thickness is substantially 3 mm. The height of each of the first and second extending members (i.e. the distance they extend from the planar member) is substantially 24 mm and their thickness is substantially 3 mm.

Figure 7C:
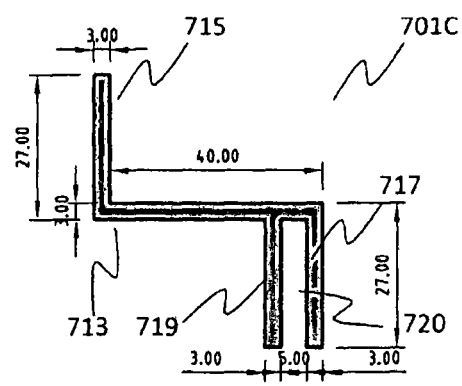

FIG. 7C shows a cross section of a third clip 701C. The clip includes a planar member 713, with a first extending member 715 extending from the planar member 713 from a first distal end of the planar member. The first extending member 715 extends in a first direction which is substantially perpendicular to a first longitudinal surface of the planar member. A second extending member 717 extends from the planar member 713 from a second distal end opposing the first distal end of the planar member. The second extending member 717 extends in a second direction (opposite to the first direction) which is substantially perpendicular to a second longitudinal surface opposing the first longitudinal surface (i.e. on the opposite side) of the planar member. The second extending member and first extending member are substantially parallel to each other. A third extending member 719 also extends in the second direction separated from the second extending member by approximate 5 mm to form a channel 720 that is arranged to receive a corresponding fin.

Figure 7D:
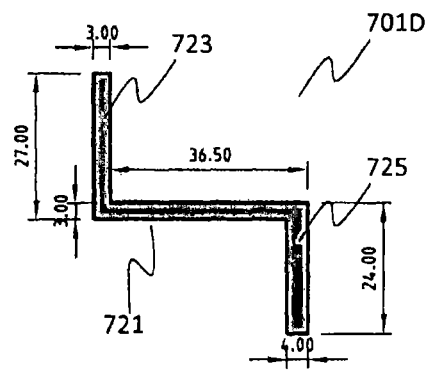

FIG. 7D shows a cross section of a fourth clip 701D. The clip includes a planar member 721, with a first extending member 723 and second extending member 725. The first and second extending members are substantially positioned in the same location, and have the same dimensions, as the first and second extending members of the third clip described above.

Regarding the first and fourth clips described above in relation to FIGS. 7A and 7D, the fins may be attached to any part of the extending member(s) or planar members. Regarding all of the clips described above, the fins may be attached to the clips using any suitable attachment means, such as a rivet. Each of the clips shown is approximately 600 mm in length.

Figure 7E:
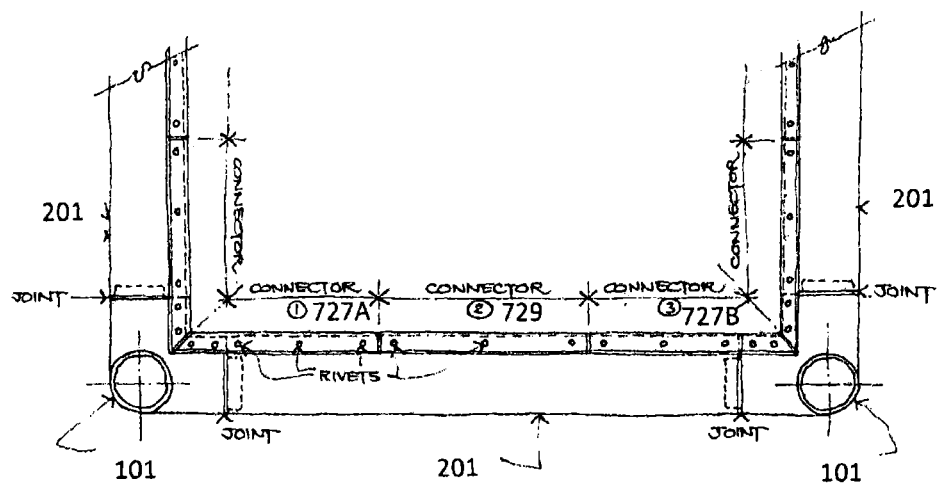
FIG. 7E shows an example of how attachment elements are attached to connection nodes and connector elements according to an embodiment of the present invention.

The clips shown in FIGS. 7B and 7C are used, for example, to connect the cast corner nodes to the connector elements as shown in FIG. 7E. For example, clip 701B is used to connect the frame when a window or door element is to be provided within an opening. Clip 701C is used when a solid composite foam panel is to be introduced into that portion of the frame.

The clips shown in FIGS. 7A and 7D are also used to connect elements together, such as panels to panels, or panels to door and/or window frames as discussed in more detail below with reference to FIGS. 8C and 8D.

Referring to FIG. 7E, in order to connect a corner (substantially perpendicular) portion of a connection node 101 to a connector element 201 (via the fins), three clips (Connector 1, 2 and 3) are used including two end clips 727A and 727B and a single central clip 729. The total length of the three connectors when attached to the fins is equal to the length of the opening along the connection nodes and connector element. According to this embodiment, the clips are riveted to the connection nodes in the corners, to the connector elements in between the two corner nodes and also through the metal layers of the composite panels to provide a braced panel for the frame.

Figure 8A:
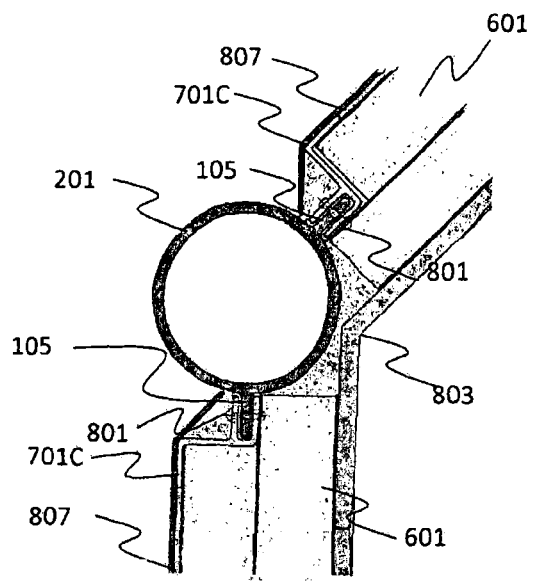
FIGS. 8A to 8D show attachment elements in use within a building system according to an embodiment of the present invention.
Figure 8B:
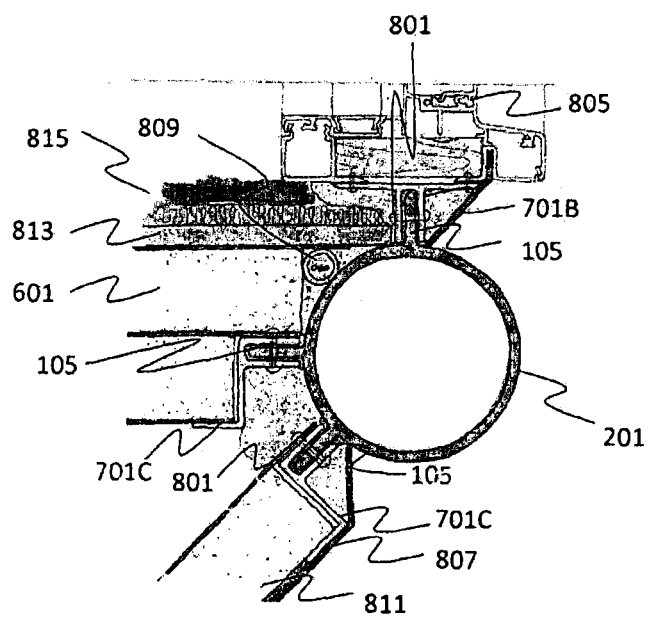

FIGS. 8A and 8B show attachment elements in use in various scenarios.

Referring to FIG. 8A, a typical section through the frame is shown. A tube 201 such as that shown in FIG. 4H includes fins 105 that are provided within a channel within the clips 701C. The fins are attached to the clips using rivets 801. A finish in the form of gyprock (or similar) 803 is also provided.

Referring to FIG. 8B, a typical section through a floor portion of the structure is shown. A tube 201 such as that shown in FIG. 4K includes fins 105 that are provided within a channel within the clips 701B and 701C. The fins are attached to the clips using rivets 801. An aluminium window section 805 is also connected to clip 701B via rivets. A prefinished surface 807, which according to this embodiment is an Alpolic™ surface, is also applied to the outer walls of the structure. A services channel 809 is provide in the gap between the composite panel and connector element to allow services (e.g. water, gas, electricity, communications etc.) to be provided.

Also shown within FIGS. 8A and 8B are the composite panels 601 that are attached to the clips. Therefore, it can be seen that the panels may be attached to the fins of the tubes and connection nodes using the available clips. A further type of composite panel 811 is also provided. This composite panel is formed from a single foam layer with an inner and outer metal layer.

FIG. 8B also shows a fibre cement layer 813 formed upon a floor panel 601. Upon the cement layer 813 is provided a carpet and underlay layer 815.

Figure 8C:
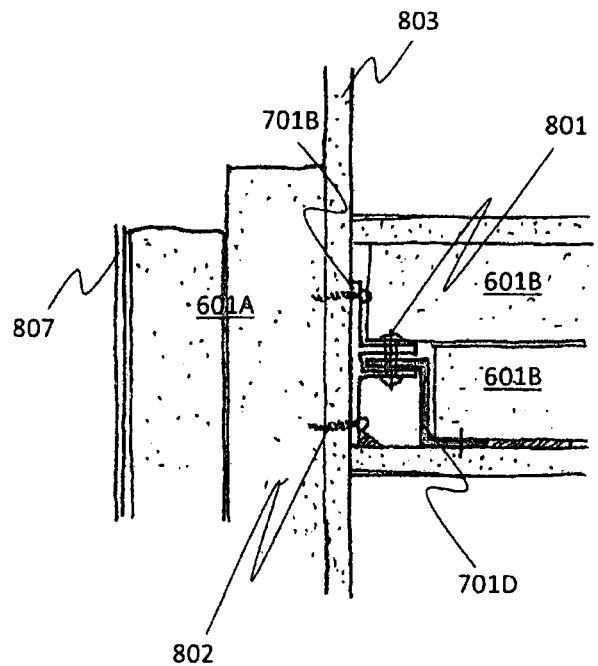

Referring to FIG. 8C, a vertically orientated panel 601A with an outer layer of Apolic 807 is connected to a horizontally orientated panel 601B using clips 701B and 701D. The clip 701B is attached to panel 601A though gyprock 803 via suitable attachment elements 802, such as screws for example. Clip 701D is attached to clip 701B by passing first extending member 723 into channel 712 (see FIGS. 7B and 7D), and riveting the two clips together using rivet 801. Clip 701D is then attached to panel 601B via second extending member 725 using any suitable attachment mechanism.

Figure 8D:
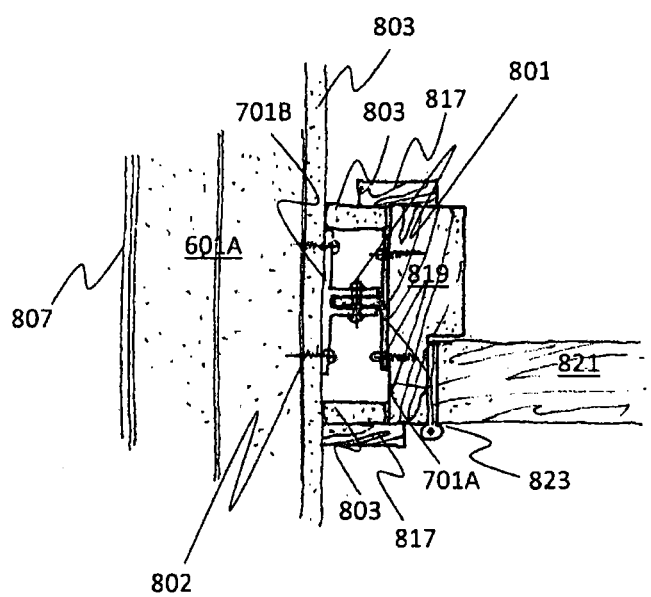

Referring to FIG. 8D, a vertically orientated panel 601A is attached to a door frame 819 using clips 701B and 701A. Clip 701B is attached to panel 601A through gyprock 803 via suitable attachment elements 802, such as screws for example. Extending member 705 of clip 701A is attached to clip 701B by passing the extending member 705 into channel 712 (see FIGS. 7A and 7B), and riveting the two clips together using rivet 801. Planar member 703 of clip 701A is placed against a door frame 819 and attached using suitable attachment elements 802, such as screws for example. A door 821 and hinge 823 are also provided. Gyprock 803 is also provided to cover the clip arrangements along with architraves 817.

It will be understood that the above example of using a door frame and door assembly in FIG. 8D may equally be applicable to a window frame and window assembly.

Figure 8E:
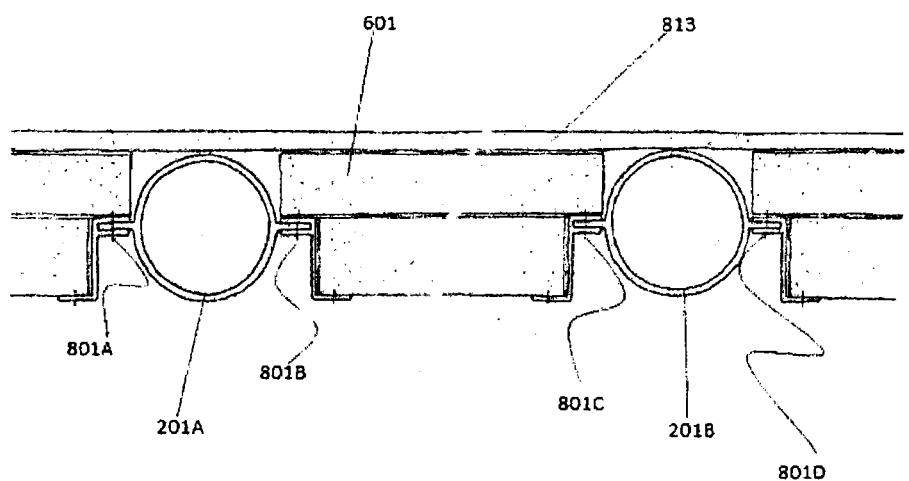
FIG. 8E shows a flooring system according to an embodiment of the present invention.

FIG. 8E shows a further example of composite panels being used as a flooring system. As can be seen in FIG. 8E a composite panel 601 (as described with reference to FIGS. 6A and 6B) is attached between two tubes 201A/B using four attachment elements (clips). According to this example, the composite panel measures 2.1 meters by 2.1 meters. In this example, each of the four clips is as described with reference to FIG. 7C. Also, the tubes used are as described with reference to FIG. 4C. However, it will be understood that one or more tubes as described with reference to FIG. 4B may also be used in positions on the flooring system where only a single composite panel is to be attached, such as at the perimeter of a floor. A flooring surface 813 may then be placed upon, attached or affixed to the panels using any suitable techniques. For example, the flooring material may be FC (fibre cement) sheeting or similar.

It can be seen from FIG. 8E that the attachment elements have a channel formed therein between two opposing extending members (the first and third extending members)

for receiving the relevant fin on the tubes. Further, the composite panel is attached to the first and second extending members via a suitable attachment device such as a rivet or adhesive (such as glue), for example. The attachment elements are arranged against the composite panel such that the upper surface of the first extending member provides support to the overlapping metal area of the metal surface 607 on the composite floor panel, the upper surface of the second extending member provides support for the smaller surface area of the composite panel and the planar member of the clip abuts the edge of the smaller panel portion.

It will be understood that the flooring panels may also include channels formed therein for receiving one or more cables, wiring, pipes and plumbing as described herein.

Figure 9A:
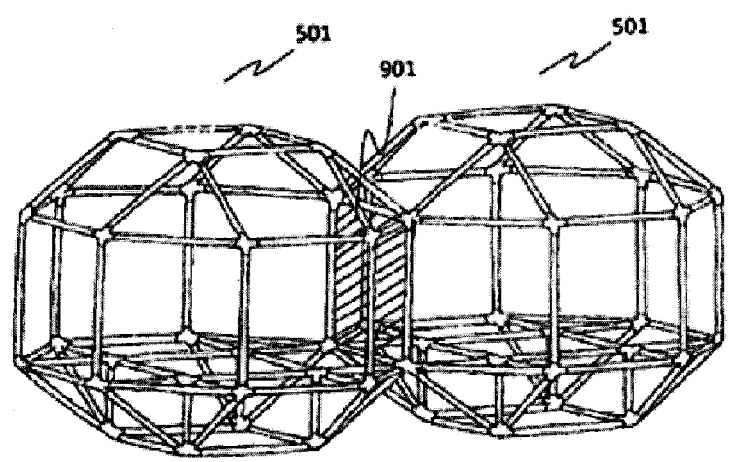
FIG. 9A shows a first configuration of two frames connected together according to an embodiment of the present invention.

FIG. 9A shows a first configuration of two frames 501 connected together. The two frames are attached to each other via the side surfaces 901 of each of the frames.

Figure 9B:
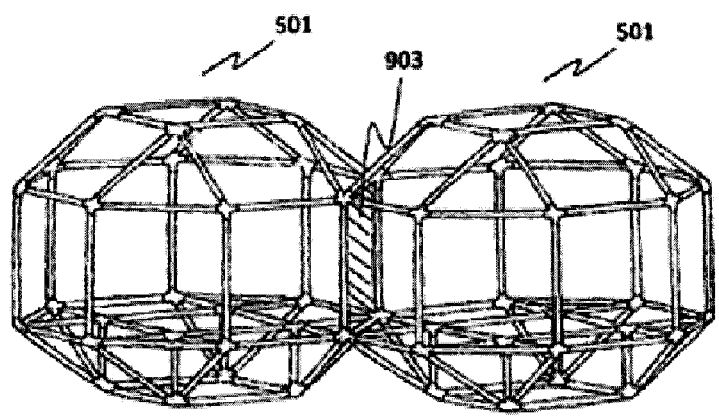
FIG. 9B shows a second configuration of two frames connected together according to an embodiment of the present invention.

FIG. 9B shows a second configuration of two frames 501 connected together. The two frames are attached to each other via the corner surfaces 903 of each of the frames.

Figure 9C:
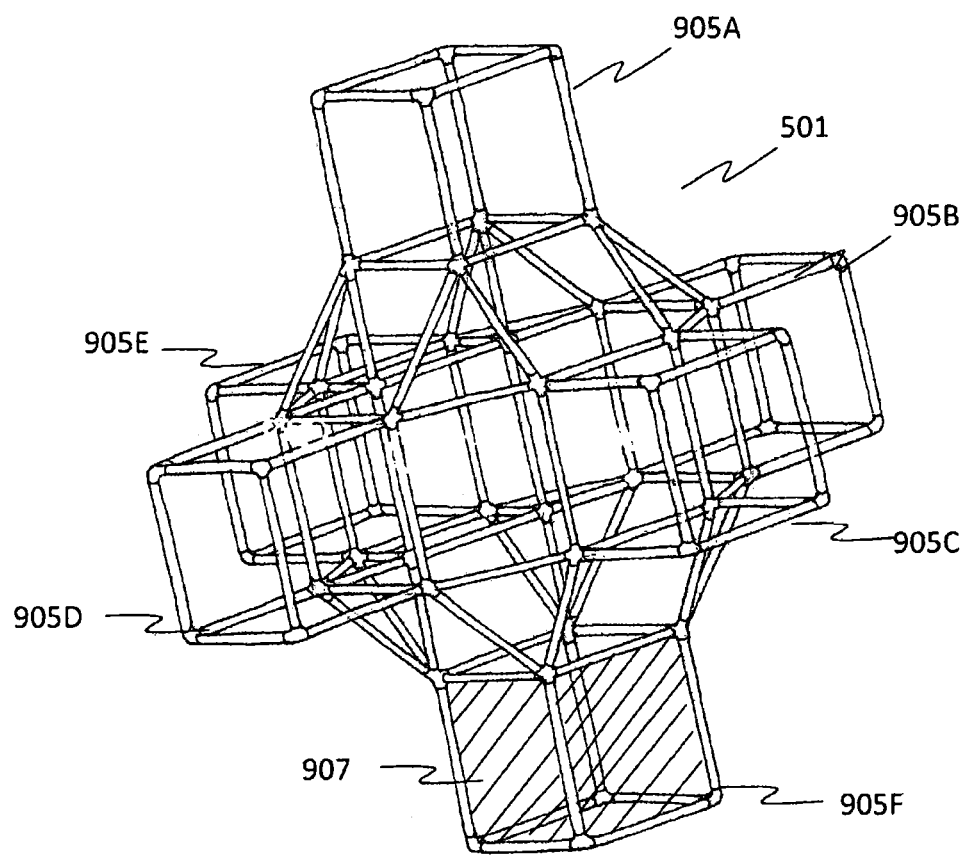
FIG. 9C shows a frame incorporating separation zones according to an embodiment of the present invention.

FIG. 9C shows a frame incorporating separation zones. The basic frame structure 501 has additional components added to it in the form of tubes and connector nodes 905A to 905E to form separation zones or areas 907. The separation areas are provided to separate the main frame 501 from other attached main frames by a defined space 907. According to this view, it can be seen that the separation areas are provided above and below the main frame 501, as well as on each side surface of the main frame.

Figure 9D:
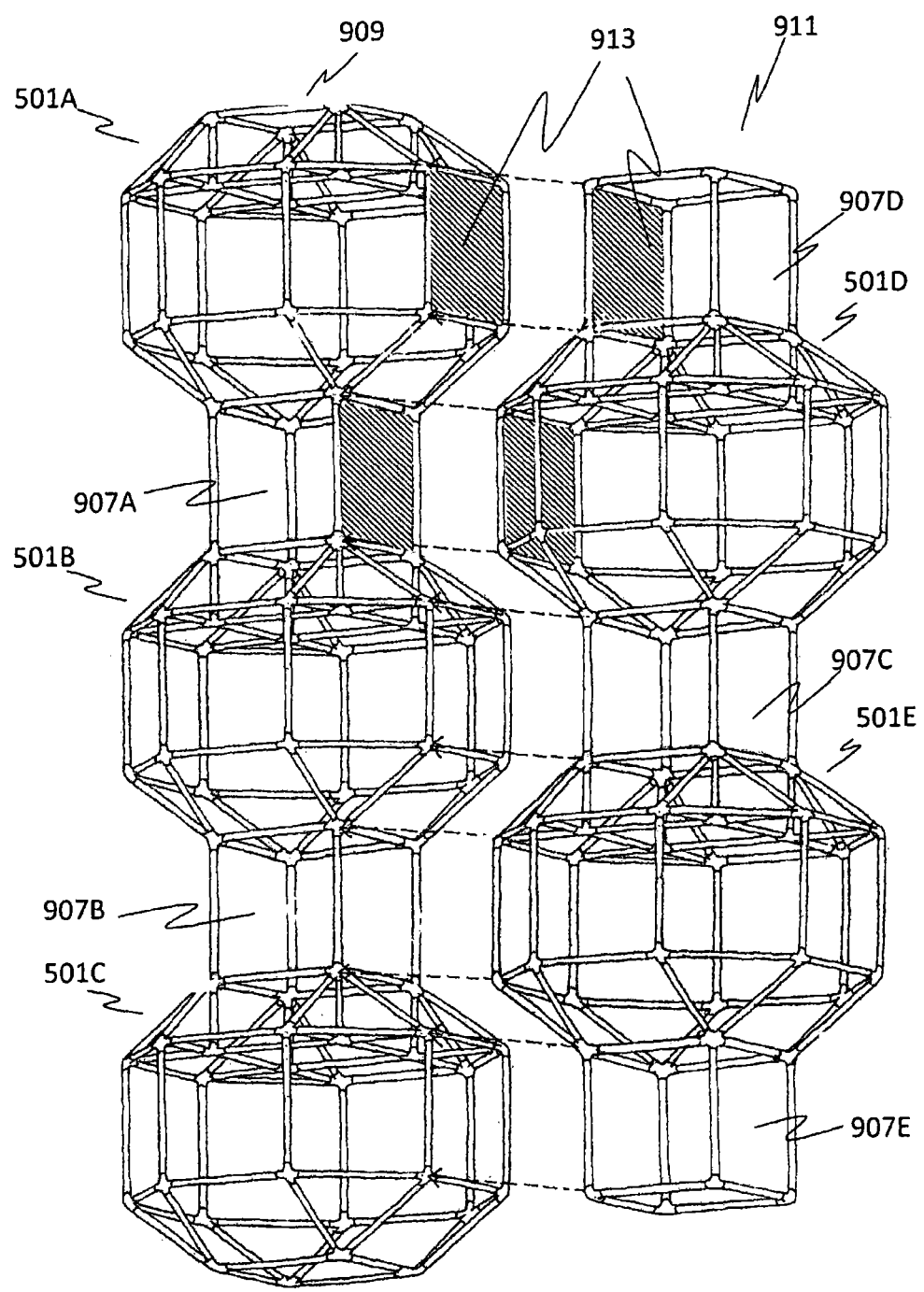
FIG. 9D shows a plurality of frames with separation zones orientated in a vertical direction according to an embodiment of the present invention.

FIG. 9D shows two sets of frames with separation zones orientated in a vertical direction. This configuration shows a first set 909 of individual frames 501A, 501B and 501C separated by two separation zones 907A and 907B. That is, first and second individual frames (501A and 501B) are separated by a first separation zone 907A and second and third individual frames (501B and 501C) are separated by a second separation zone 907B.

A second set 911 of individual frames 501D and 501E are separated by a third separation zone 907C. A fourth separation zone 907D is formed on top of the individual frame 501D and a fifth separation zone 907E is formed on the bottom of the individual frame 501E.

The relative height of the two sets of frames is then offset to interlock the two sets such that the side surface of a frame abuts the side surface of a separation zone. The two sets of frames are joined by changing and sharing the interconnecting node connectors and tubes where the frames are being joined. Therefore the two sets of frames are joined via adjacent surface areas or zones 913. This interconnection provides an improved structural integrity to the entire building structure by forming vertical columns within the structure.

Figure 9E:
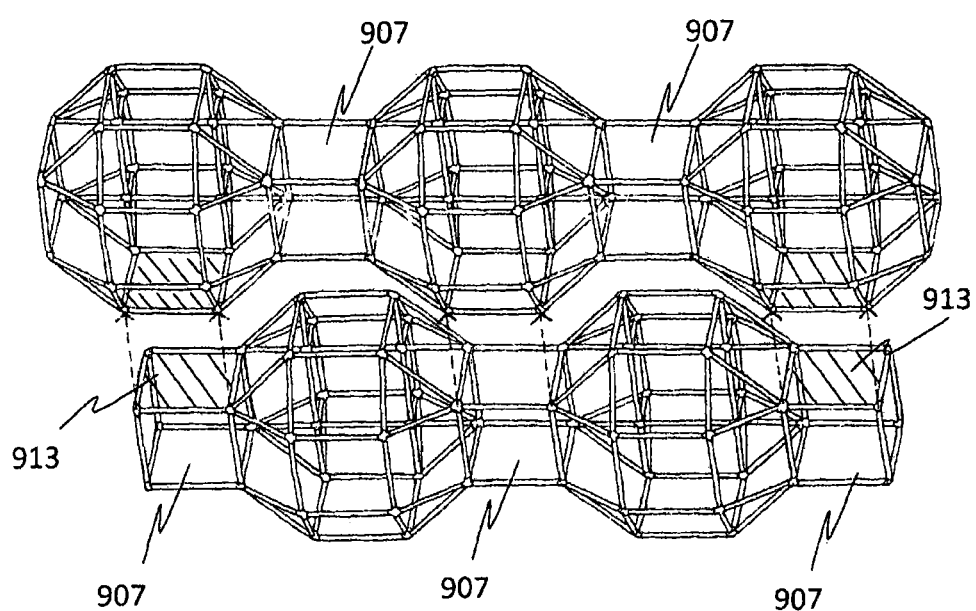
FIG. 9E shows a plurality of frames with separation zones orientated in a horizontal direction according to an embodiment of the present invention.

FIG. 9E shows a plurality of frames with separation zones orientated in a horizontal direction in substantially the same offset manner as described above with reference to FIG. 9D. This provides a similar improved structural integrity to the building structure by forming horizontal braces within the structure.

Figure 9F:
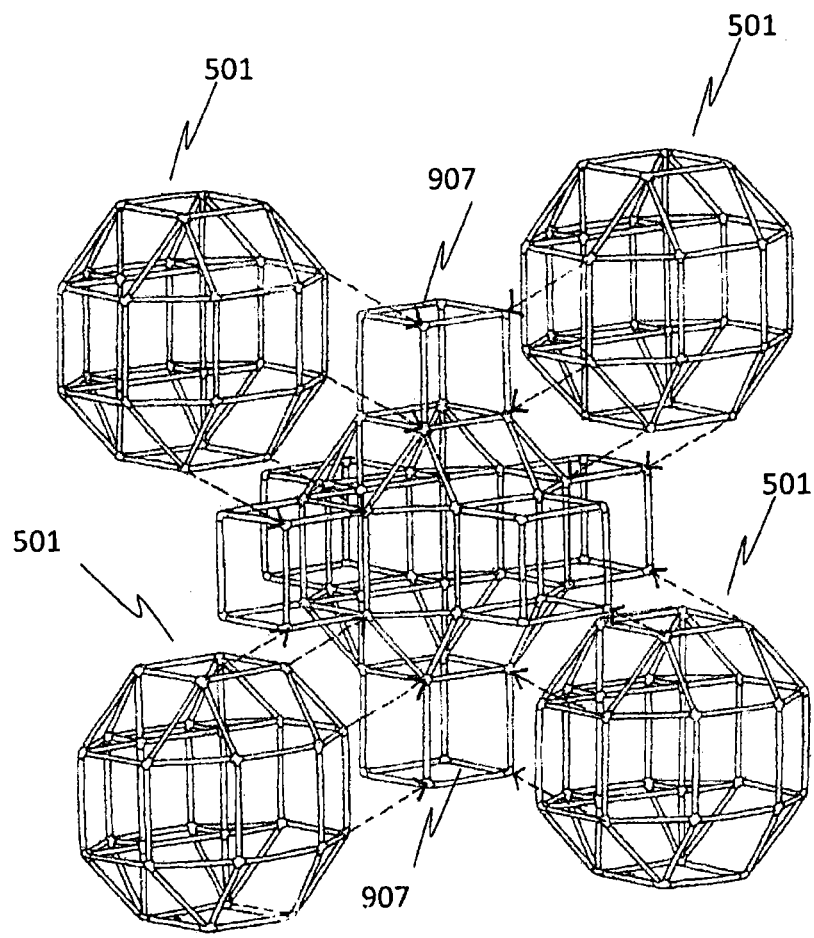
FIG. 9F shows a plurality of frames attached to a further frame with separation zones orientated in both a horizontal and vertical direction according to an embodiment of the present invention.

FIG. 9F shows a different method of providing interlocking frames. A frame system as described with reference to FIG. 9C has additional basic frame portions 501 attached to it by sharing connection nodes and tubes.

Figure 9G:
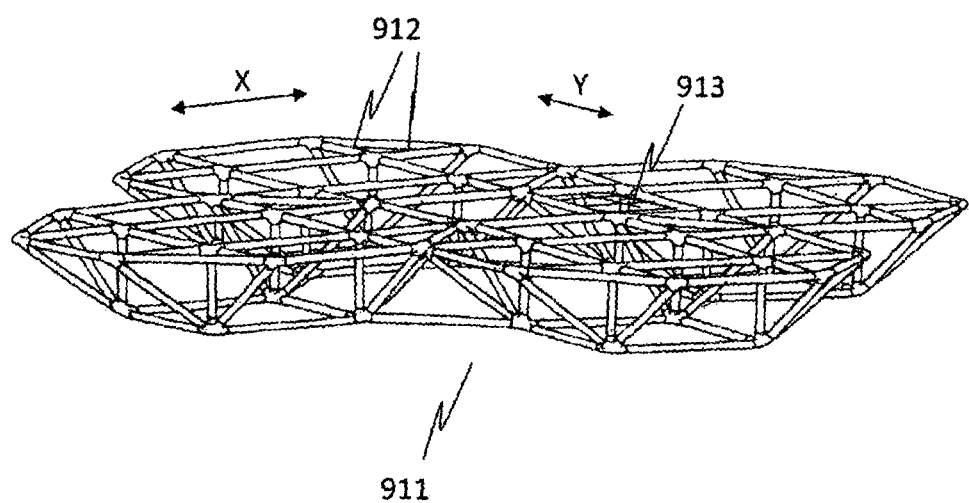
FIG. 9G shows a first configuration of a floor section of a frame according to an embodiment of the present invention.

FIG. 9G shows a first configuration of a floor section 911 with all horizontal supports 912 included in an X and Y orientation. Floor panel attachment areas 913 are provided. It will be understood that the panels are attached to the fins on the connection nodes and connector elements (tubes).

Figure 9H:
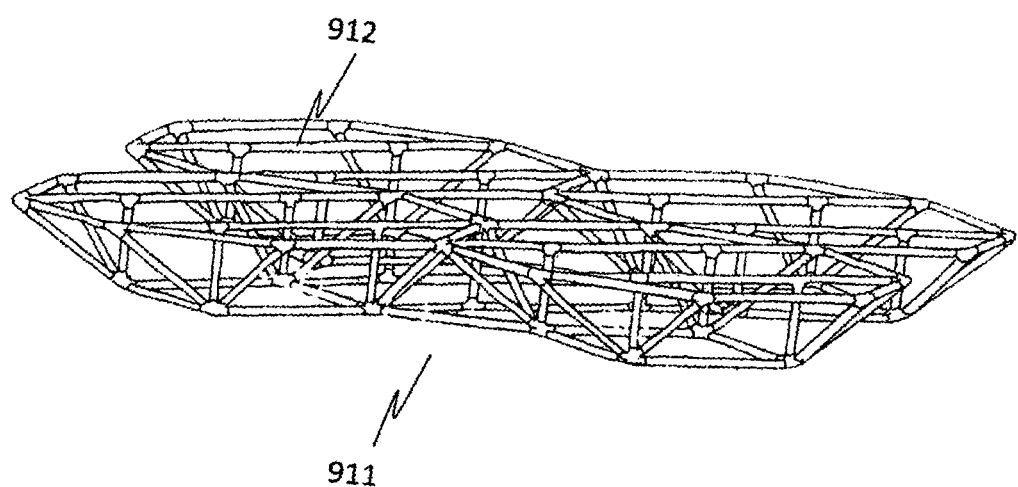
FIG. 9H shows a second configuration of a floor section of a frame according to an embodiment of the present invention.

FIG. 9H shows a second configuration of a floor section 911 where the Y orientated horizontal supports have been removed, leaving only the horizontal supports 912 oriented along the X-axis.

Once the full building structure frame has been put together and formed and all the required panels have been attached, the building structure may be tensioned at the appropriate place by running tensile elements through the cavities formed within the tubular sections and nodes. Upon tightening these tensile elements, tension in the frame is countered and the system is made structurally sound. For example, the tensile element(s) may be a tensile rod or a tensile cable. It will be understood that the tensile elements may be installed progressively as a way to hold the structure together during construction in cases where the panels are not yet sufficiently holding the structure together.

Figure 11A:
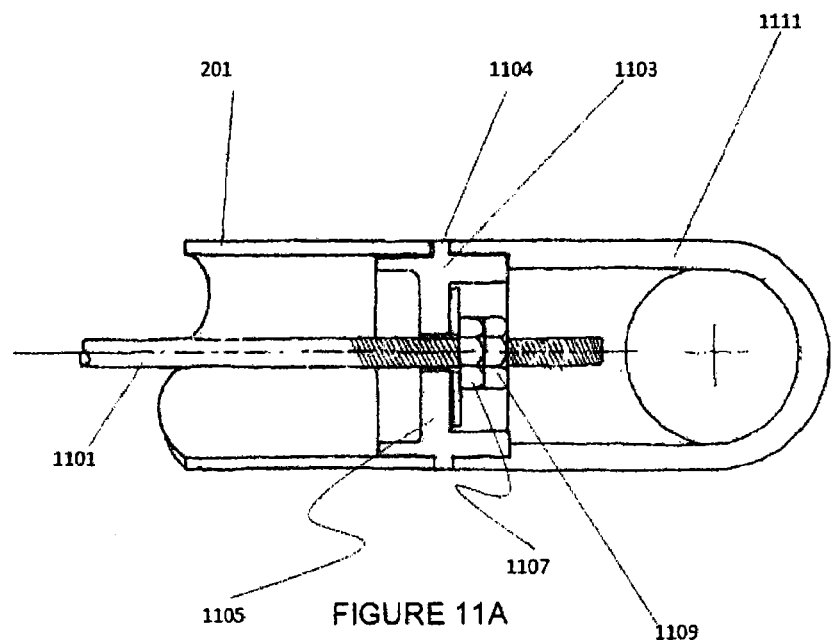
FIGS. 11A and 11B show a tensile system according to an embodiment of the present invention.
Figure 11B:
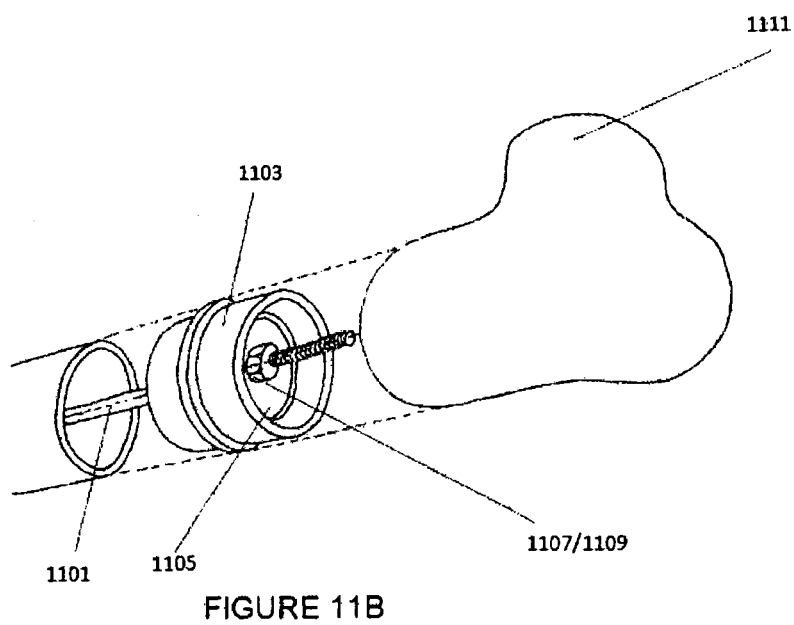

FIGS. 11A and 11B show further details of the tensioning system that may be incorporated in various embodiments of the herein described building system. For example, the tensioning system may be incorporated in the single pod examples as shown in FIGS. 5A and 5B, or multiple pod system as shown in FIGS. 9A to 9F. Further, the tensioning system may be used in the flooring system as shown in FIGS. 9G and 9H, or a roofing and/or flooring system shown in FIGS. 12A to 12C. It will be understood that various portions of the frame system may be analysed to determine whether they are compressive or in tension. When in tension, the tensioning system as described may be used through one or more of the cavities provided by the various elements of the system to counter the tensile force.

According to this example, a tensile element in the form of a cable 1101 made from steel or any other suitable tensioning material is passed through the cavity of any number of tubes and/or nodes until a first distal end is attached to the end of a tube 201, according to this example. In this example, the tube 201 has a tube cavity 203 through which the first distal end of the tensile cable 1101 exits the tube. The first distal end of the tensile cable then passes through a central aperture of an attachment device 1103. According to this example, the attachment device is a casting formed from any suitable material, such as aluminium or steel for example. The outer circumference of the attachment device matches the inner circumference of the tube 201 and slides into the tube cavity 203. A first side of a projection 1104 located around the outer periphery of the attachment device abuts the edge of the tube 201. A washer 1105 is placed over the tensile cable. The end of the tensile cable includes a thread for receiving a first nut 1107. The first nut is placed onto the thread and tightened until the cable is securely attached to the tube 201 via the attachment device. The tension cable is then pulled via a second distal end of the tension cable. The tension from the tension cable being pulled against the first nut causes the attachment device 1103 to securely abut the edge of the tube 201 via the projection. A second nut, a lock nut 1109, is then placed onto the thread to lock the first nut 1107 in position. At a second distal end of the tensile cable, the same process occurs via another tube 201 and nut combination to tighten the cable 1101 so that the cable is tensioned to a sufficient tension suitable to counter the tension forces in the frame. A cap 1111 is then placed over each of the tensile cable attachment elements 1103 until the edge of the cap abuts a second side (opposing the first side) of the projection 1104. The dimensions of the cap 1111 are such that the cap securely attaches to the attachment device. As an alternative, a modified node may be used instead of a cap, where one of the extending portions of the node functions as a cap.

It can be seen from FIG. 11A that the female interface of the tube 201 is not attached to a male interface of a corresponding connection node, but instead the attachment device 1103 forms a male interface. When the attachment device 1103 is combined with the cap 1111, the tube portion is shut off and the tensioning system can be used to tension the system. The combination of cap 1111 with the attachment device 1103 located therein forms an element (cap and attachment device) having a male interface that engages with the female interface of the tube 201.

It will be understood that a fluid seal as described herein may also be placed inside the tube around the tensile element to provide a seal for any fluids that are to be introduced into the tube cavity.

As a further alternative, the cap may be replaced with a node 101 or a further tube.

It will be understood that one or both ends of the tensile element may be attached to a tube or a node. Further, it will be understood that the second distal end of the tensile element 1101 may be attached to a tube or node in the same manner as described above. Further, it will be understood that one or both ends of the tensile element may be adjustable for adjusting the tension. Where only one end of the tensile element is adjustable, the other end may be permanently affixed to the tube or node by any suitable means. It will further be understood that alternative mechanisms for attaching the tensile element to the frame (whether a node or a tube) are envisaged, such as clamping and leveraging the tensile element.

Figure 10A:
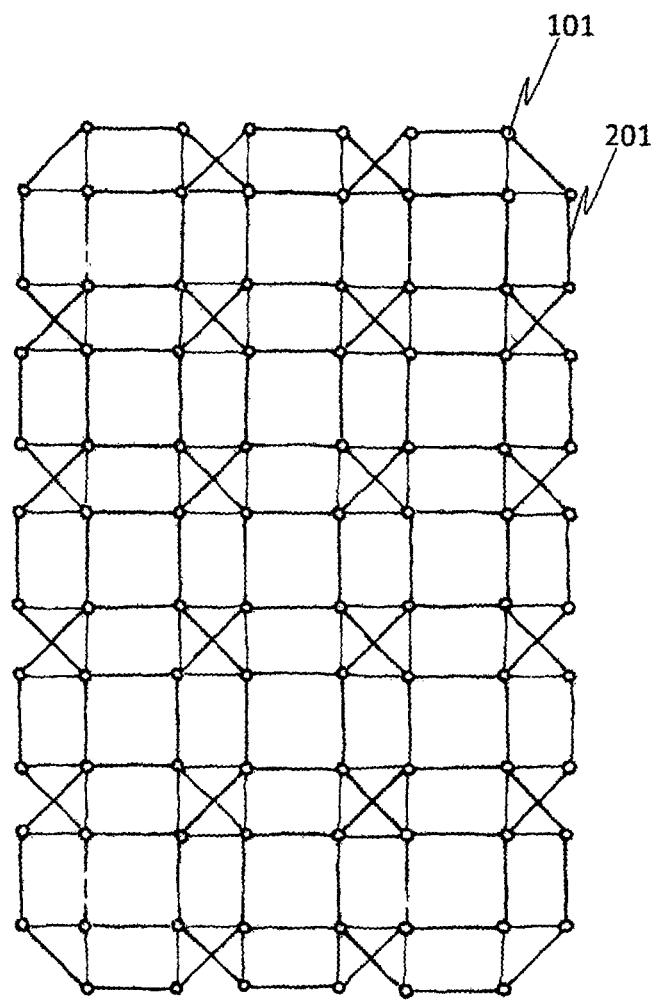
FIGS. 10A to 10E show various geometrical arrangements based on the configuration shown in FIG. 9B according to an embodiment of the present invention.
Figure 10B:
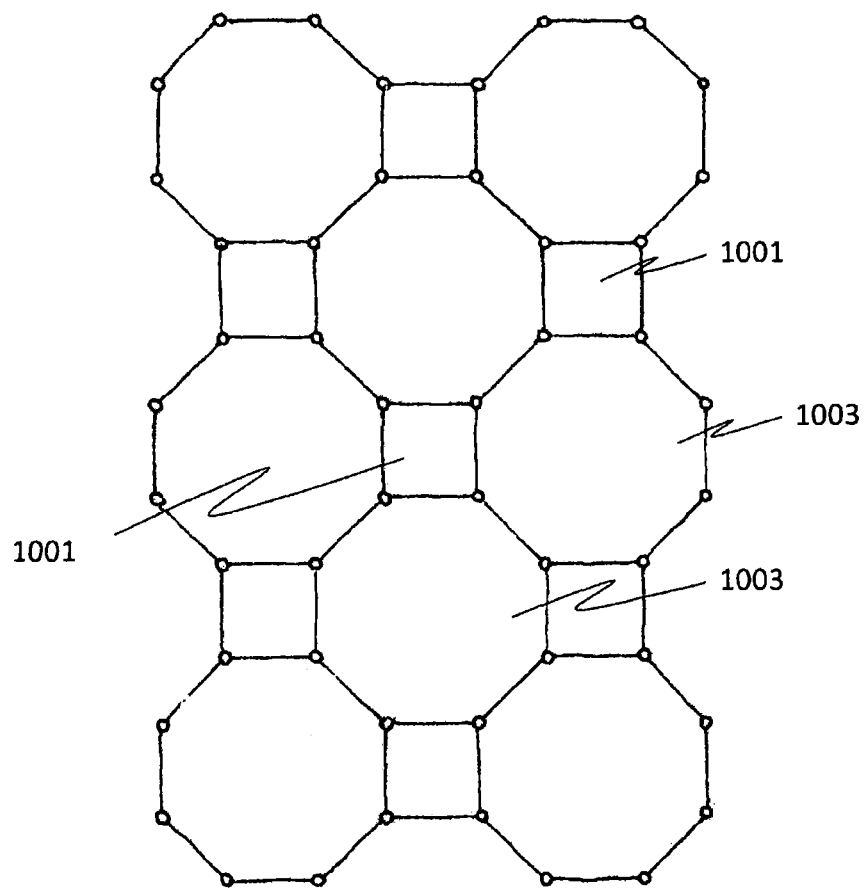
Figure 10C:
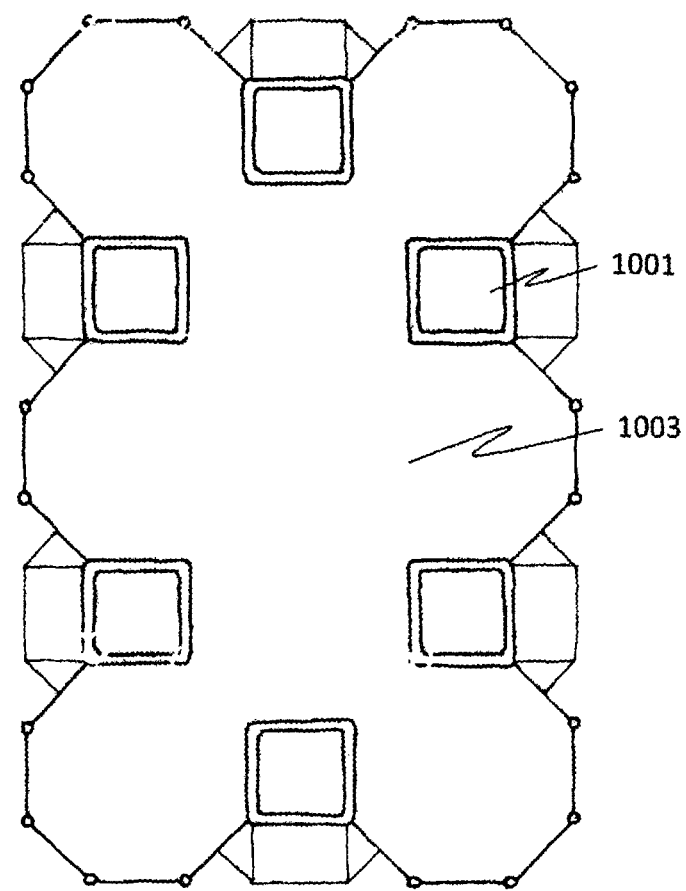
Figure 10D:
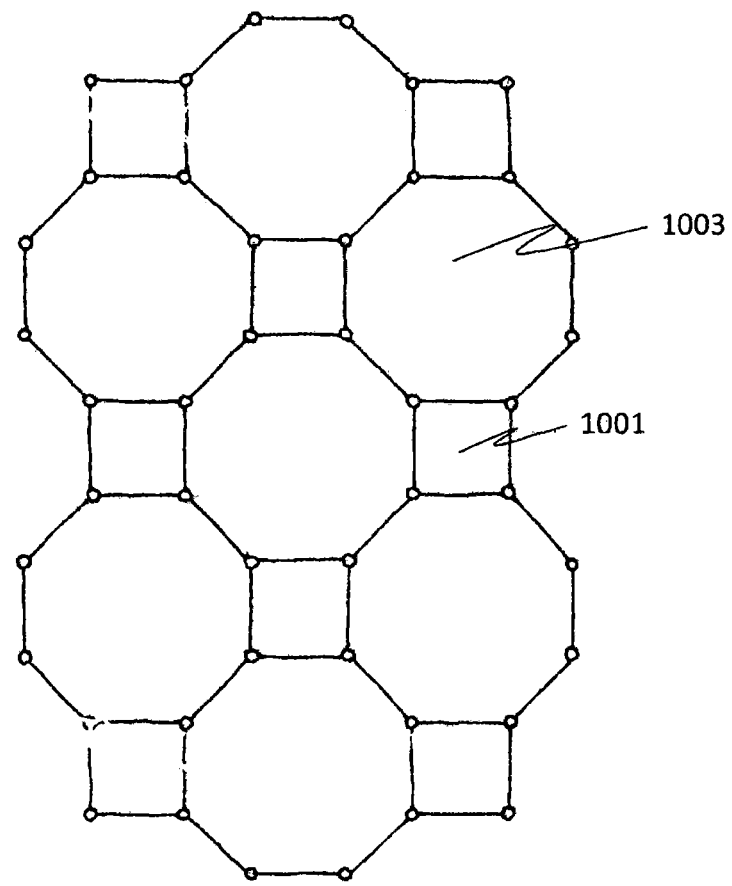
Figure 10E:
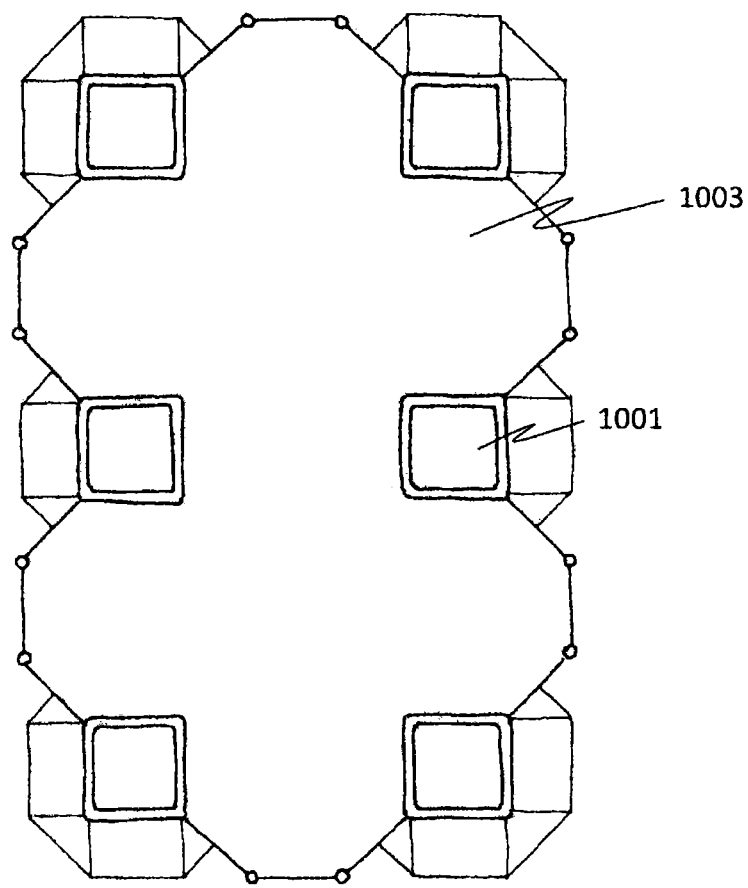

FIGS. 10A to 10E show various geometrical arrangements based on the configuration shown in FIG. 9B. FIG. 10A shows a full matrix of all the interconnecting elements (tubes) as a plan view looking through the structure. By passing through horizontal layers of the building structure, it can be seen that columns 1001 are formed as shown in FIGS. 10B and 10C, which show the layout of the structure at different levels. Also, human useable spaces or zones 1003 are formed. By disconnecting internal portions of the frame structure, designers are able to modify the living/working areas created by the structure as seen in FIG. 10C, which is a plan view of a living space with the upper portion of the frame not shown. In other words, the human usable zone created by assembling the frame structure is further defined by removing certain internal elements of the frame structure. By keeping the column supports (and brace supports), the structural integrity of the building is maintained while at the same time providing flexibility for the internal design. FIGS. 10D and 10E show a slightly different configuration of frames to FIGS. 10B and 10C to indicate how the zones may be altered.

Figure 10F:
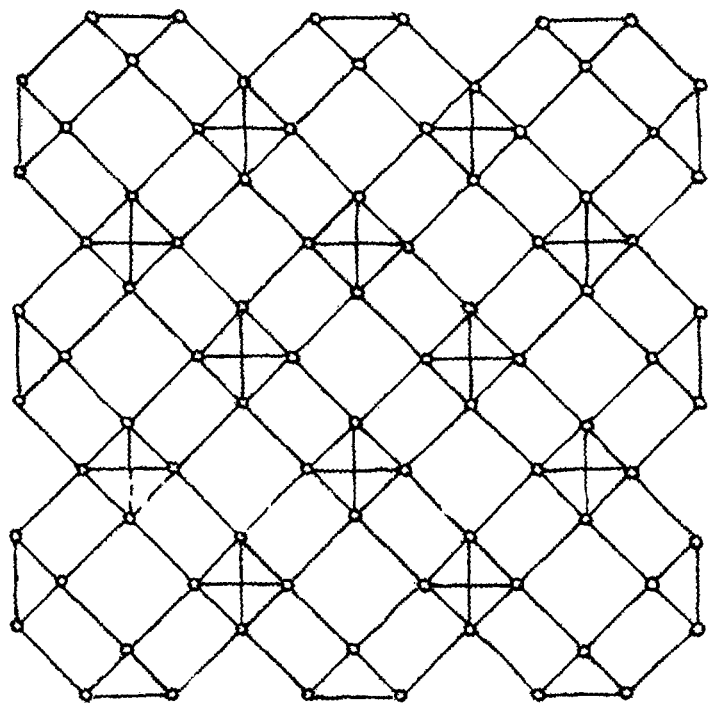
FIGS. 10F to 10J show various geometrical arrangements based on the configuration shown in FIG. 9A according to an embodiment of the present invention.
Figure 10G:
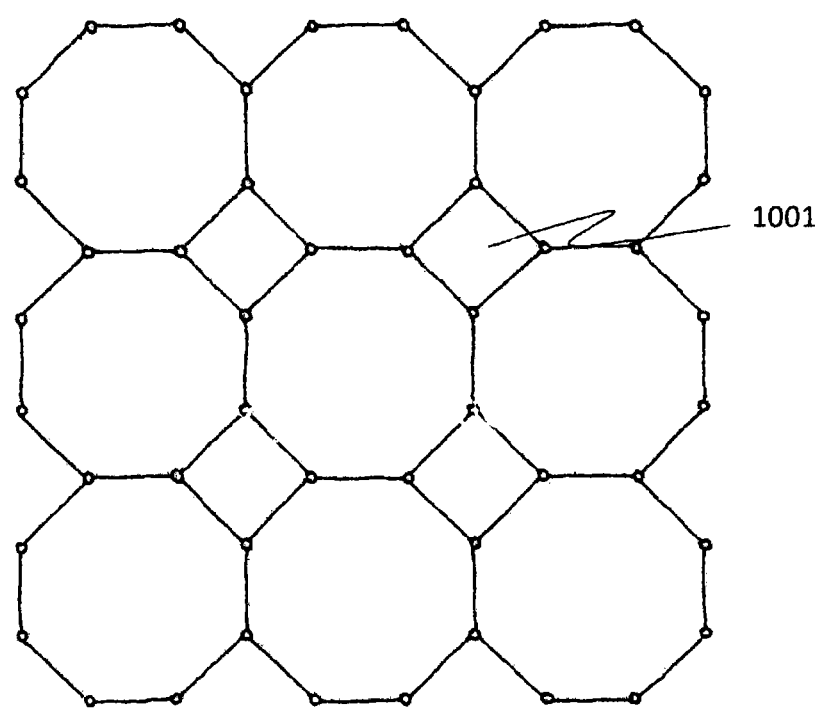
Figure 10H:
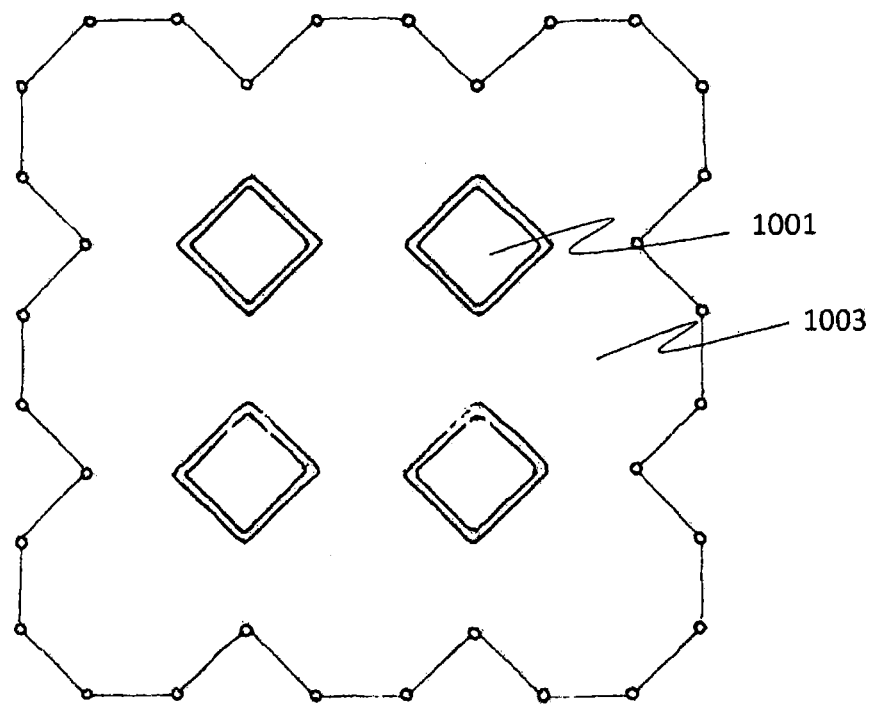
Figure 10I:
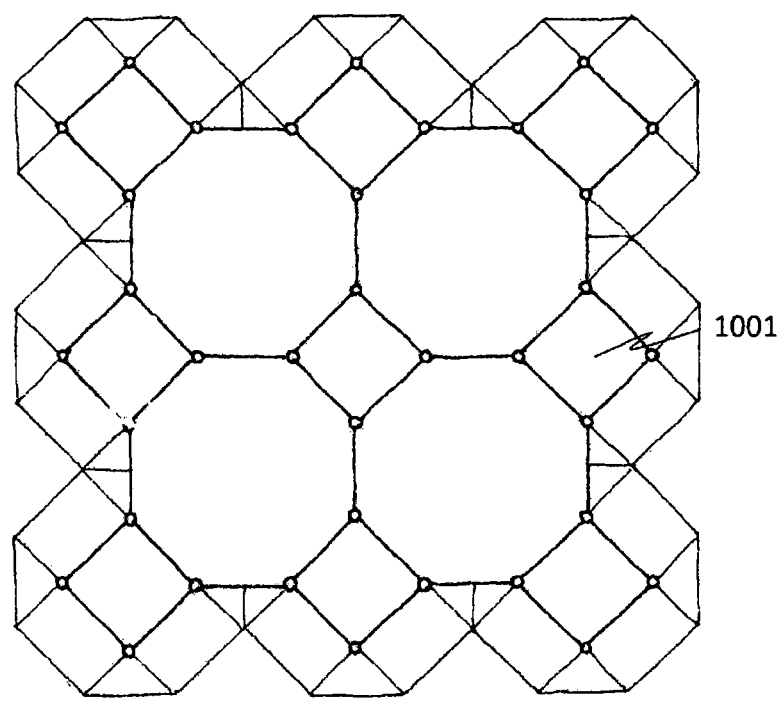
Figure 10J:
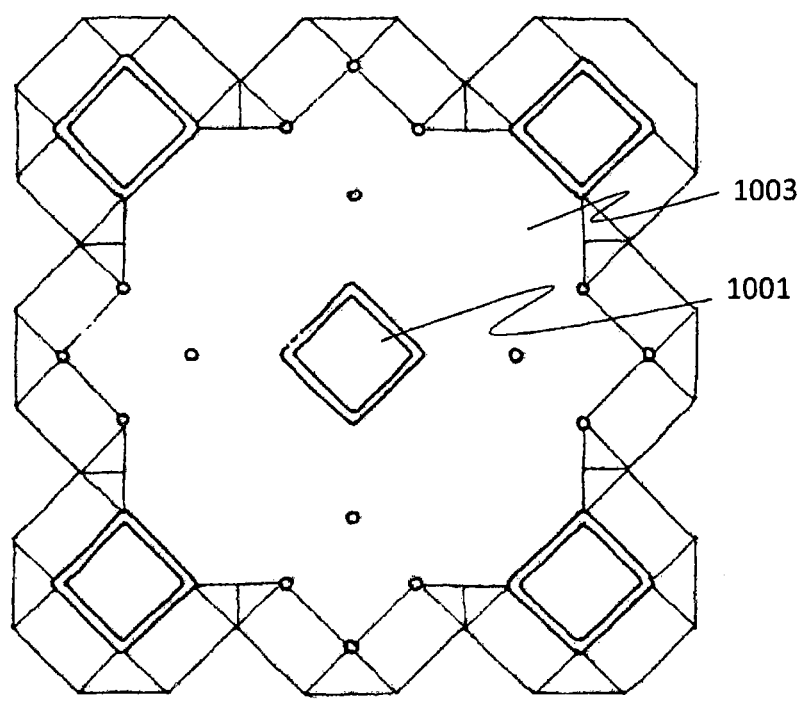

FIGS. 10F to 10J show various geometrical arrangements based on the configuration shown in FIG. 9A. FIG. 10F shows a full matrix of all the interconnecting elements (tubes) as a plan view looking through the structure. FIGS. 10G & 10H and FIGS. 10I & 10J show two different configurations of frames identifying the column portions 1001 and human useable areas 1003 of the structure. The same principal as described above with reference to FIGS. 10A to 10E applies.

Further Embodiments

It will be understood that the embodiments of the present invention described herein are by way of example only, and that various changes and modifications may be made without departing from the scope of invention.

For example, it will be understood that the various elements and components of the herein described system may be used and/or modified to enable different shaped frames to be formed for different uses. For example, various different forms of building structure may be constructed, such as factory spaces, homes, offices, hangars, retail environments etc.

Figure 15:
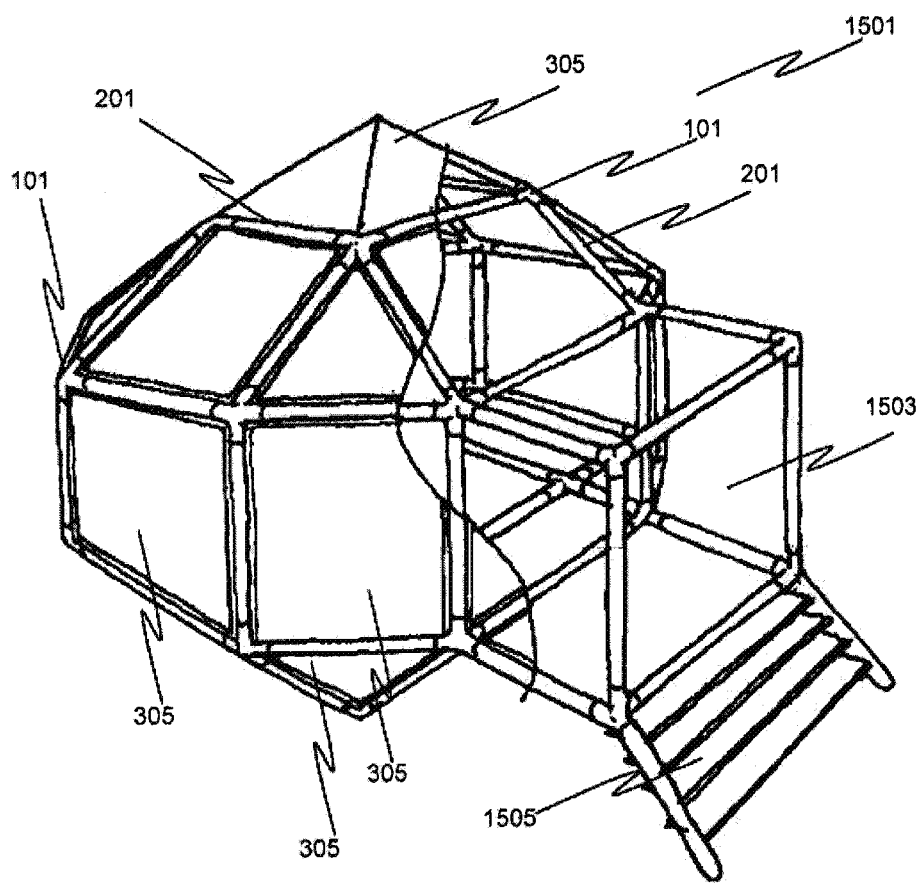
FIG. 15 shows a building system in the form of a house, home or office according to an embodiment of the present invention.

As shown in FIG. 15, the various elements and components of the herein described system are used in a building structure 1501 in the form of a home, house or office (for example). The nodes 101 interconnect with the connector elements 201 in a defined arrangement to create a frame. This frame forms a human useable internal living or working zone of predetermined size, shape and geometry within a boundary of the frame. In this example, an entrance 1503 is provided and formed from elements and components of the herein described system. The entrance 1503 enables persons to enter and leave the living or working zone, for example via a set of stairs 1505. FIG. 15 is represented to show one half of the arrangement including panels 305 with another half shown without panels to show the structure more clearly. The panels form the floor, walls and roof of the structure as described herein.

Figure 12A:
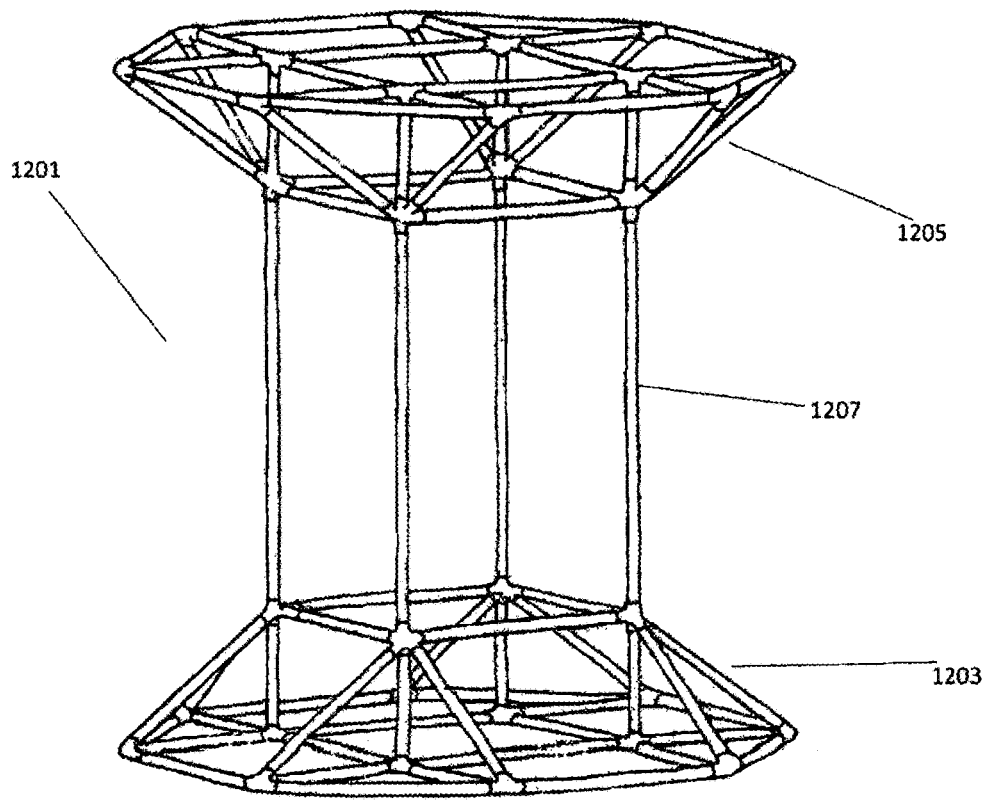
FIGS. 12A to 12C show an expandable roofing and flooring system according to an embodiment of the present invention.
Figure 12B:
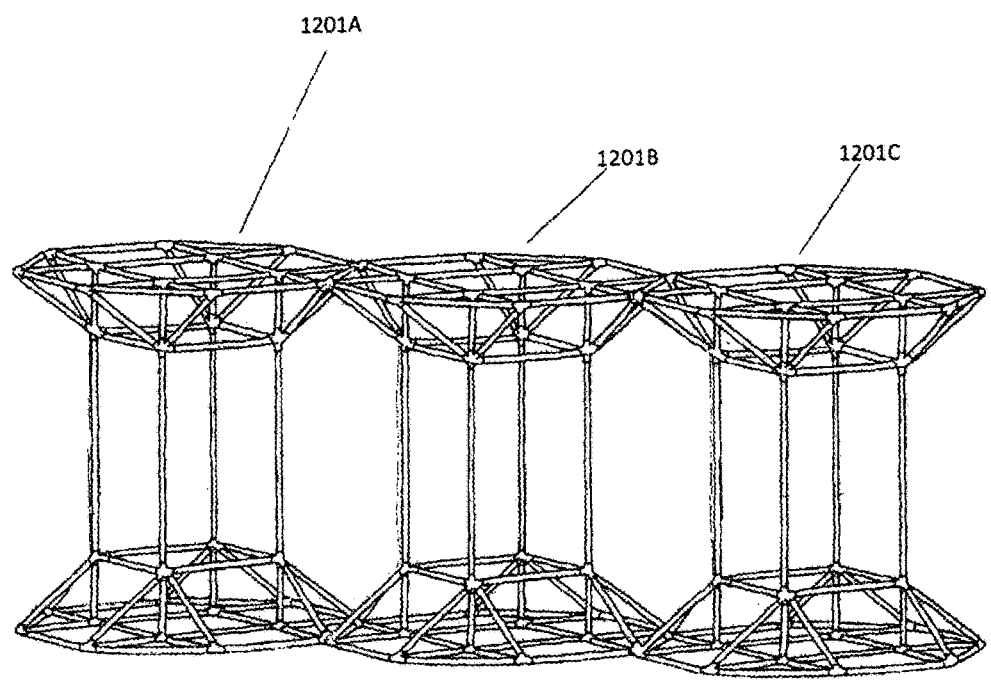
Figure 12C:
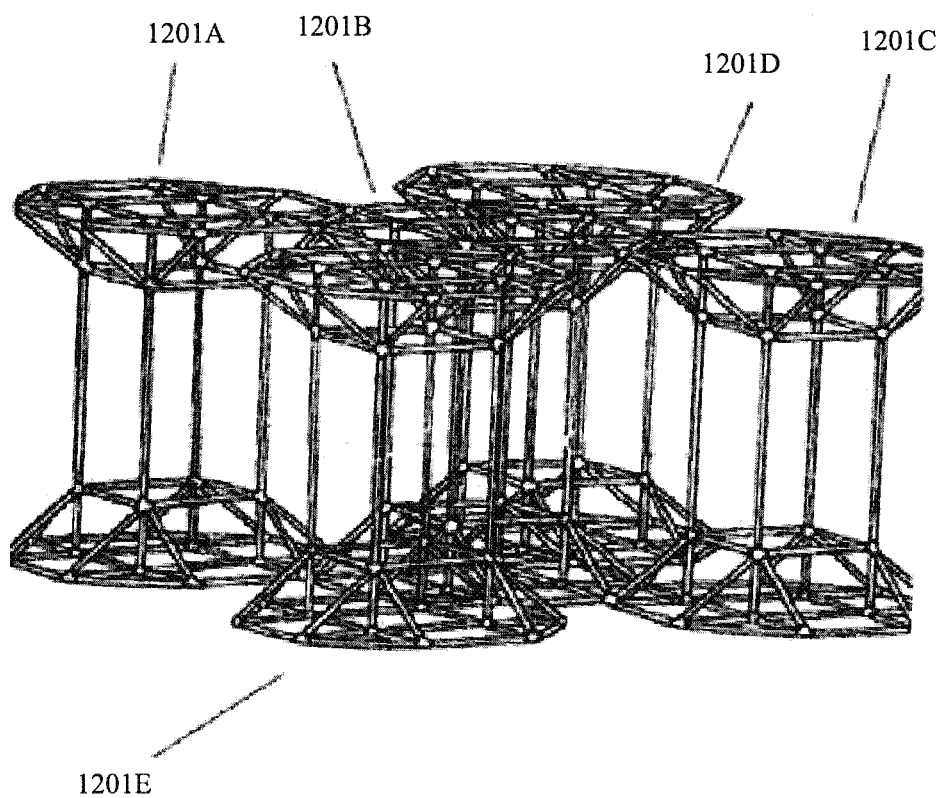

FIGS. 12A-12C show how various elements of the system as described herein may be modified to construct a building with large roof spans, such as an aircraft hangar or stadium for example. According to this example, FIG. 12A shows how two portions of a frame 1201 forming a floor structure 1203 and a roof structure 1205 may be connected together using four vertical tubes 1207. According to this example, the floor and roof structures maintain the octagonal cross sectional plan of the building system as described herein and are formed from the upper or lower portions of the pods described with reference to FIGS. 5A and 5B with further interconnecting tubes and nodes to provide increased structural support and/or strength. The roofing and flooring structures are separated by a distance as defined by the length of the tubes 1207.

As can be seen in FIG. 12B, a number (three in this example) of floor and roof portions 1201A, B and C may be interconnected to provide a large longitudinal roofing and flooring structure. FIG. 12C shows how the structure may be expanded using any number of further floor and roof portions (1201D, 1201E) to form any footprint required for the building.

The flooring and/or roofing structures described and as shown in the figures may also include the tensioning system described herein to counteract any tension within the structure. For example, the roofing system may be in compression and the flooring system in tension, thus requiring the tension elements to be passed through the cavities formed in the tubular elements and nodes.

Further, cross braces may be provided between the vertical tubes 1207 to provide additional support for bracing the structure.

It will be understood that this large span roofing and flooring system may be used in conjunction with the platform system described herein to form stadiums and grandstands.

Figure 13A:
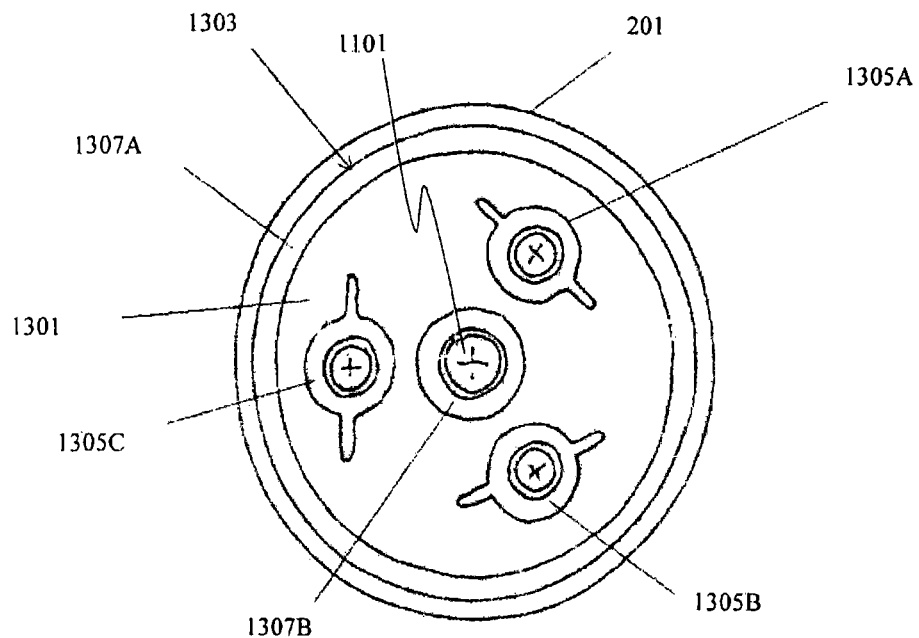
FIGS. 13A to 13C show a fluid system according to an embodiment of the present invention.
Figure 13B:
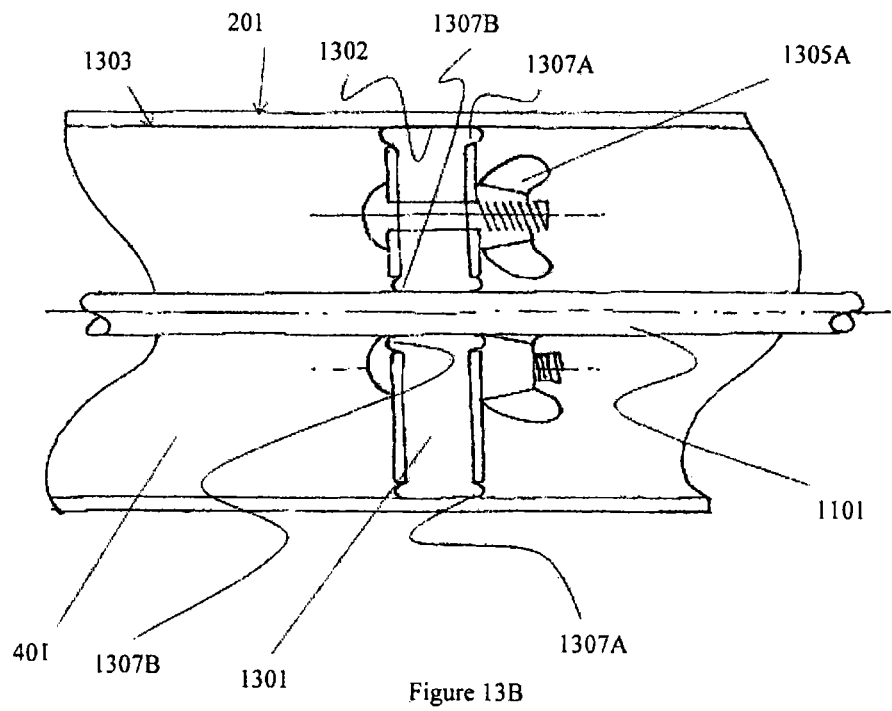

FIGS. 13A and 13B show a sealing system for a fluid flow system that may be applied to various embodiments of the herein described system. This fluid flow system may be used to enable fluid to flow through one or more continuous cavities formed through at least a portion of the nodes and tubular sections. The fluid may be any suitable gas or liquid. The term "continuous cavity" in this context means a cavity that flows through one element (such as a tube or node) to other elements unimpeded. It is not intended to necessarily mean that the cavity is formed in a loop, but may optionally include this. For example, the continuous cavity may flow from point A through two or more tubes and/or nodes to point B that is distinct from point A. As a further example, the continuous cavity may flow from point A through two or more tubes and/or nodes and back to point A via one or more fluid supply systems as described herein.

For certain gases or liquids (such as corrosive gases or liquids, or where certain gases or liquids are more prone to leaking) a suitable coating may be provided on the internal surface of the tubes or nodes to provide protection or extra sealing for the tubes and nodes. For example, a thin plastic layer may be coated on the internal surface.

As seen in FIGS. 13A and 13B, a fluid tight seal 1301 is provided for use in a tube 201 of the herein described system. These seals, or any other type of seal, may be positioned or placed at any point throughout the system to create and modify one or more continuous cavities within the frame.

According to the example shown in FIGS. 13A and 13B, a tension element 1101 is also provided. However, it will be understood that the herein described fluid system does not necessarily require the inclusion of the tensioning system.

The disc like fluid tight seal 1301 is formed from one or more rubber based synthetic materials depending on the function of the seal and the type of fluid it is sealing. The seal is inserted within the tube at the appropriate place where the continuous flow of the fluid is to stop. The diameter of the seal is approximately the same diameter as the internal diameter of the tube 201. The outer edge 1302 around the periphery of the seal abuts the internal surface 1303 of the tube. At this stage, a fluid tight seal is not yet maintained. A number of wing nuts (1305A-C) are provided through apertures formed through the seal, whereupon tightening the wing nuts causes the seal to be compressed at the area where it is tightened and the outer edge 1307A of the seal to push up against the internal surface of the tube. Further, the surface 1307B of the seal resting against the tensioning element 1101 is also forced up against the tensioning element. This causes a fluid tight seal to be formed around the periphery of the seal against the internal surface of the tube, as well as around the aperture of the seal and the tensioning element (where used).

According to this embodiment, the seal includes a central aperture for receiving the tensioning element. It will be understood that, as an alternative, the seal may not have a central aperture where a tensioning element is not being used.

Figure 13C:
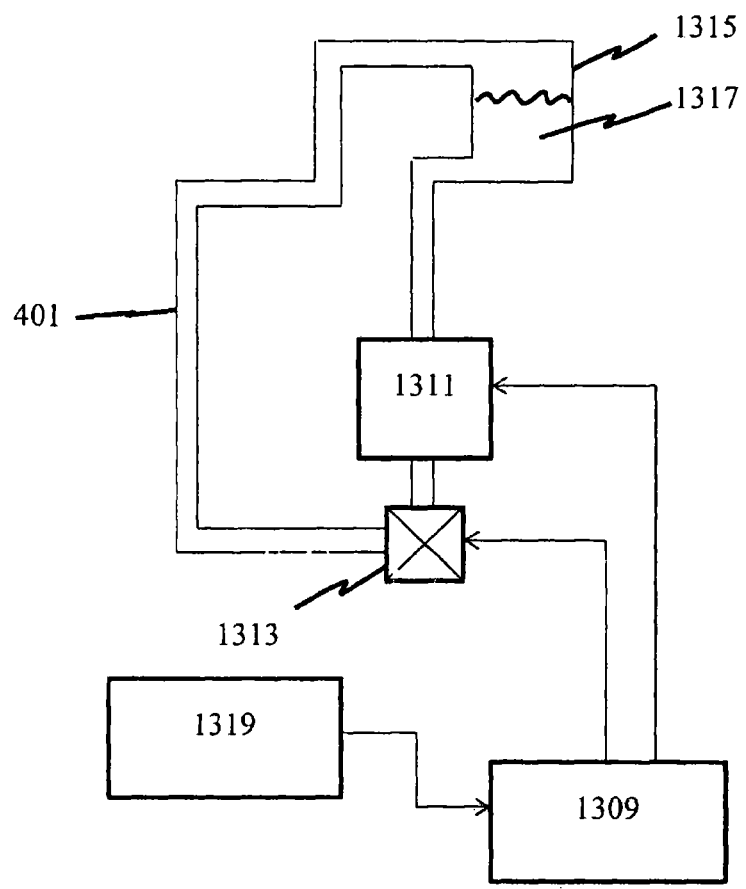

FIG. 13C shows an example of a fluid supply system that enables fluid to be supplied and flow through one or more continuous cavities 401 formed through at least a portion of the tubes and tubular sections. The fluid supply system includes a control unit 1309 that can selectively operate at least one pump 1311 that is in fluid communication via a fluid valve 1313 with a continuous cavity 401. The control unit includes a switching device that is adapted to switch the pump on or off and open and close the valve 1313 dependent upon a control input. The control input is a signal sent from a device 1319 that may be one or more of a temperature gauge, heat sensor, smoke detector and air conditioning control unit, for example. Upon activating the pump 1311 and opening the valve 1313, fluid 1317 stored in a fluid tank 1315 may then be pumped around the continuous cavity 401. It will be understood, that as an alternative, the fluid tank 1315 may be incorporated as part of the continuous cavity 401 to enable the fluid to recirculate.

For example, the fluid supply system may include cold water that may be circulated around a portion of the frame to provide a cooling mechanism. Also, the water may be pumped through water sprinklers upon detection of a fire from a smoke alarm, heat sensor or temperature gauge. The water sprinklers may be directly attached to one or more tubes and/or nodes. Also, the water may be pumped around portions of the frame to provide a mechanism for cooling the frame and potentially cooling a social space or work area formed by the frame upon detection that the temperature in a particular space has exceeded a pre-set value. As a further alternative, the fluid being pumped through or around a continuous cavity may be heated to provide a heating function for raising the temperature in a human useable zone.

According to a further example, the fluid may be a water and glycol mixture to provide a heat retardant function which aims to keep the water from freezing and so stop the aluminium frame from becoming too warm. This fluid mixture may be pumped around the system upon detection of a fire from a smoke alarm, heat sensor or temperature gauge, or merely during hot weather.

As a further alternative, additional cooling or heating devices may be incorporated to aid the cooling or heating of the fluid or fluid mixture such as air conditioning units or refrigeration units.

According to a further example, the fluid may be air. For example, a pump may be used to circulate air around portions of the frame. Various tubes may include outlets for providing ventilation into a social space or work area. As a further example, air conditioning units may be used to cool or heat the air being supplied to control the environment in the social space or work area.

As a further example, the continuous tubular system may be used to evacuate waste liquids from the building, such as storm water for example. That is, the storm water may be evacuated by activating a valve that allows the water to pass from guttering in fluid communication with the tubular system, through one or more tubes and/or nodes to be drained or stored for future use.

Internal portions of the frame may be coated to act as a container for the storage of high pressure compressed air, which can be stored and reused to drive mechanical devices such as fans, pumps and air conditioning units. The compressed air may be produced by vertical turbine wind generators which are an optional component within the tubular structure.

As a further example, separate containers may be added into the cavities within the frame structure. These fluid containers may be high pressure tanks, sewerage tanks, storm water detention tanks etc.

Air pressure within the system may be maintained by a column of liquid contained within another part of the same tubular structure. Water pressure within the system may be maintained by linking vertical tubular sections together, such that the higher the building the higher the water pressure for supply.

Figure 14:
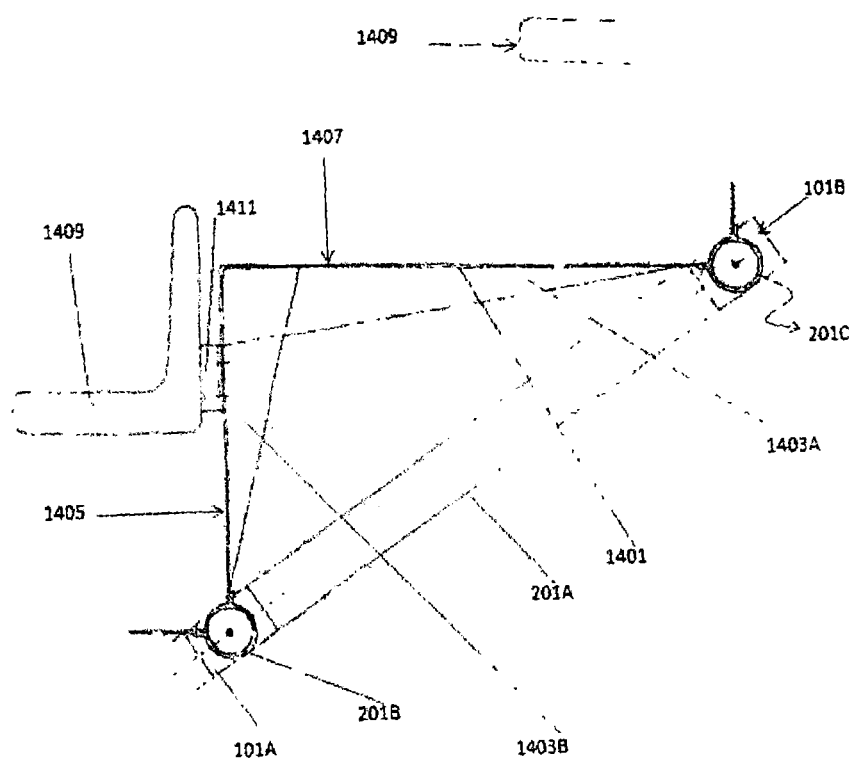
FIG. 14 shows a platform system according to an embodiment of the present invention.

FIG. 14 shows how various elements of the herein described system may be used to build platform and seating supports. For example, platform and seating supports may be provided for grandstands and stadiums, for example, where a human useable zone is provided external to the frame of the platform structure.

The tubular system may be reconfigured to create a structural system that will support platforms and seating for spectators in stadiums and other forms of grandstand. The specific geometry of the platform and seating supports as described herein may integrate with the tubular wall & roof systems and geometry of the building system as herein described. However, it will be understood that the specific geometry described above may be modified for use in a platform and/or seating system. For example, the angles between the extending portions from the nodes may be modified to provide a viewing platform for use in a stadium that is less than 45 degrees from the surface plane. This provides a suitable gradient upon which spectators may be located to enable each row in the platform arrangement to view what is happening on the surface.

Figure 1D:
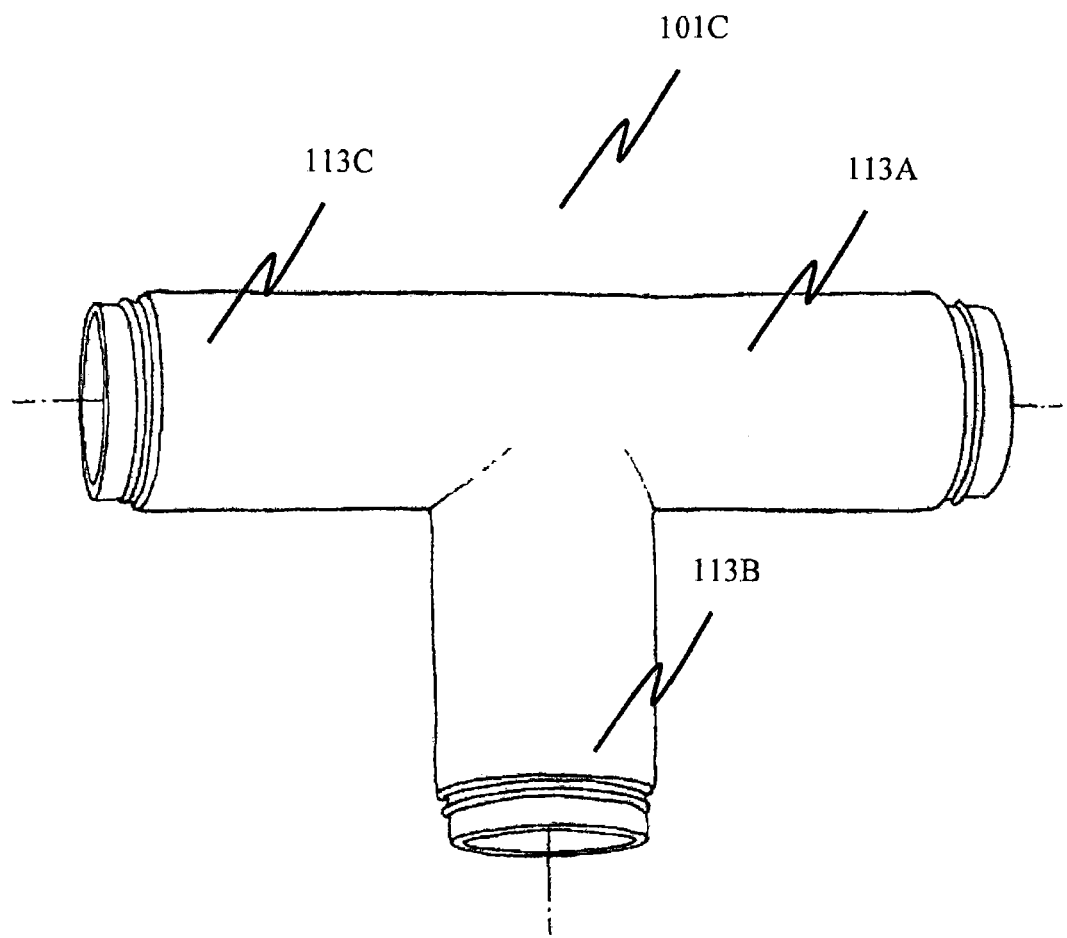
FIGS. 1D to 1E show a further connection node according to an embodiment of the present invention.
Figure 1E:
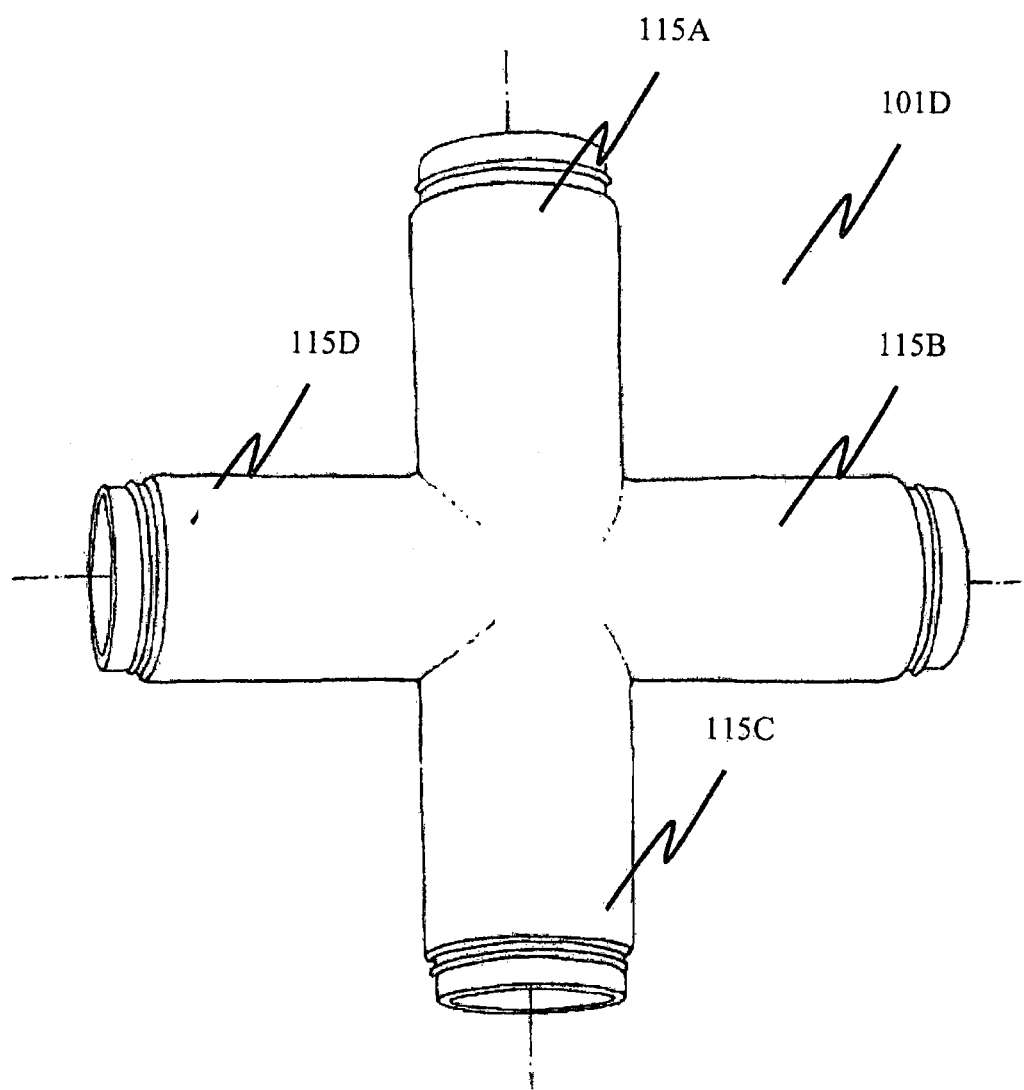

FIG. 14 shows a side view of a portion of a platform system integrating various components of the herein described building system, where this portion of the platform is repeated in the horizontal and vertical direction to provide platform system. A first tube 201A is attached between two nodes 101A and 101B. According to this example, the nodes may include three or four extending portions in a T-shape or X-shape configuration to allow tubes to be attached, where the extending portions are positioned at 90 degrees to each other and lie in the same plane (as shown in FIGS. 1D and 1E. Further extending portions may be provided where needed to provide additional support, for example.

FIG. 1D shows connection node 101C, which includes three extending portions 113A, 113B and 113C in a T-shape configuration. All three extending portions lie in the same plane. The first extending portion 113A is separated from the second extending portion 113B by 90 degrees. The second extending portion 113B is separated from the third extending portion 113C by 90 degrees and the first extending portion 113A is diametrically opposed to the third extending portion 113C.

FIG. 1E shows connection node 101D, which includes four extending portions 115A, 115B, 115C and 115D in an X-shape configuration. All four extending portions lie in the same plane. The first extending portion 115A is separated from the second extending portion 115B by 90 degrees. The second extending portion 115B is separated from the third extending portion 115C by 90 degrees. The third extending portion 115C is separated from the fourth extending portion 115D by 90 degrees. The fourth extending portion 115D is separated from the first extending portion 115A by 90 degrees. The first extending portion 115A is diametrically opposed to the third extending portion 115C. The second extending portion 115B is diametrically opposed to the fourth extending portion 115D.

Further tubes (including 201B & 201C) extend from the nodes 101A and 101B (see FIG. 14) as well as further nodes (not shown). It will be understood that any number of nodes and tubes may be used to extend the platform arrangement as described herein. According to this example, the tubes extending horizontally (201B, 201C) include two fins as described with reference to FIG. 4D.

According to this example, a platform structure having an L-shaped profile 1401 is provided. This structure may be made from steel or aluminium, for example. Additional supports in the form of gussets (1403A and 1403B) may be provided where needed. The platform structure 1401 includes a first surface 1405 against which a seat 1409 may be attached. A second surface 1407 of the platform structure 1401 is provided for spectators to walk upon. A first end of the platform structure is attached to a planar portion of a first tube 201B and a second end of the platform structure is attached to a planar portion of a second tube 201C. The platform structure effectively forms a riser 1405 and a tread 1407, where the tread surface is sufficient enough for persons to move along the platform structure when a seat is provided.

It will be understood that the platform structure may incorporate tubes with only a single fin (such as described with reference to FIG. 4B) where those tubes are located at the upper or lower regions of the platform structure.

Further, it will be understood that a number of tubes with or without any fins may be provided in between various nodes to form the vertical elements of the platform structure.

Further, it will be understood that the platform structure may be made from a formed metal element that incorporates multiple stages of the platform. For example, the platform structure may have multiple risers and/or multiple treads, where a portion of the platform structure is formed to accommodate the tubular system of the frame.

The invention claimed is:

1. A building system comprising:
 a) a plurality of tubes;
 b) a plurality of connection nodes, each of the nodes including i) a common central connection point on each of the connection nodes and ii) tubular sections extending from the common central connection point of each of the connection nodes for connection to the plurality of tubes, wherein the common central connection point is integrally formed with the tubular sections; and
 c) at least one tensile element;
 wherein:
 i) each of the tubular sections extending from the common central connection point is joined to the common central connection point at the connection node;
 ii) the tubes are arranged to connect between the connection nodes to form a frame;
 iii) the frame forms at least part of a human useable zone, the human useable zone being an internal living space formed by the frame for use as a living area in which people may utilize for their desired needs, and includes an entrance enabling a person to enter and leave the zone;
 iv) a continuous cavity is formed through at least a portion of the nodes and the tubular sections and the tubes when the tubular sections and tubes are connected, and the cavity is arranged to receive the at least one tensile element;
 v) the tensile element is attached between at least a first point and a second point on the frame for countering tension in the frame, wherein at the first point the tensile element is attached to a tensile element attachment device in the form of a casting and arranged in or secured to a distal end of the respective tube or tubular section;
 vi) the first tensile element attachment device is provided with a separate tension adjustment member for securing the tensile element via the first tensile element attachment device to the tube or tubular member, wherein both the first tensile element attachment device and the tension adjustment member are arranged at the end of the same respective tube or tubular section; and
 vii) the tensile element is adjustable at least at the first point by the tension adjustment member for adjusting the tension of the tensile element.

2. The building system of claim 1 wherein the frame forms at least part a roof structure, floor structure and wall structure.

3. The building system of claim 1 wherein the said at least two tensile member attachment devices are located within a respective said tube, or of said tubular sections from a respective said connection node or said respective connection node.

4. The building system of claim 1 wherein the said at least two tensile member attachment devices comprises a first tensile element attachment devices and a second tensile element attachment device, and wherein said first and second tensile element attachment device(s) are arranged in the tubular sections or tubes for attaching a first distal end and a second distal end of the at least one tensile member.

5. The building system of claim 1 further comprising a plurality of panels, wherein the panels are attachable to the frame to define the least one human useable zone.

6. The building system of claim 5 wherein at least a portion of the connection nodes comprise at least two extending portions that are arranged to connect with at least two tubes, and the at least two extending portions are positioned at an angle of 135 degrees relative to each other to form the frame having an octagonal plan cross-section.

7. The building system of claim 6 wherein the tubes comprise a planar portion extending from an outer circumference of the tubes in a direction that is substantially perpendicular to the tangent of the outer circumference, and a planar portion that forms a panel attachment surface for attachment to the panels.

8. The building system of claim 1, further comprising a composite panel, the composite panel comprising i) a first panel including a first panel portion, a second panel portion, the second panel portion defining an overlapping area, and a foam core positioned between the first panel portion and the second panel portion of the first panel, and ii) a second panel arranged on the first panel and including a first panel portion, a second panel portion, both the first and second panel portions of a first dimension, and a foam core positioned between the first panel portion and the second panel portion of the second panel, wherein the dimension of the first panel portion of the second panel is the same as the dimension of the second panel portion of the second panel to form a larger area attached to the overlapping area of the second panel portion of the first panel, wherein the larger area is for attachment to a frame of a building structure, and the composite panel is adapted for use as a wall, ceiling or flooring component of the building structure.

9. The building system as claimed in claim 1, wherein the casting is provided with a projection at a first side located around an outer periphery of the tensile element attachment device and configured to abut the edge of the respective tube at the first point.

10. A composite panel for a building system, the composite panel comprising:
  i) a first panel including
    a) a first panel portion,
    b) a second panel portion, the second panel portion being larger than the first panel portion defining an overlapping area,
      wherein a foam core positioned between the first panel portion and the second panel portion of the first panel, and
  ii) a second panel arranged on the second panel portion of the first panel and including
    a) a first panel portion,
    b) a second panel portion, both the first and second panel portions of the same dimension, wherein a foam core positioned between the first panel portion and the second panel portion of the second panel, and wherein the dimension of the first panel portion of the second panel is the same as the dimension of the second panel portion of the second panel to form a larger area which is attached to the overlapping area of the second panel portion of the first panel, wherein the larger area is for attachment to a frame of a building structure, and the composite panel is adapted for use as a wall, ceiling or flooring component of the building structure.

11. The composite panel of claim 10, wherein at least one of the first and second panels comprises one or more channels formed therein for receiving one or more of cables, wiring, pipes, and plumbing.

* * * * *